US009670392B2

(12) United States Patent
Larson et al.

(10) Patent No.: US 9,670,392 B2
(45) Date of Patent: Jun. 6, 2017

(54) STABLE THERMAL RADICAL CURABLE SILICONE ADHESIVE COMPOSITIONS

(71) Applicant: Dow Corning Corporation, Midland, MI (US)

(72) Inventors: Kent Larson, Midland, MI (US); Kristen Steinbrecher, Midland, MI (US); James Tonge, Sanford, MI (US); Afrooz Zarisfi, Midland, MI (US)

(73) Assignee: DOW CORNING CORPORATION, Midland, MI (US)

( * ) Notice: Subject to any disclaimer, the term of this patent is extended or adjusted under 35 U.S.C. 154(b) by 146 days.

(21) Appl. No.: 14/766,770

(22) PCT Filed: Feb. 10, 2014

(86) PCT No.: PCT/US2014/015571
§ 371 (c)(1),
(2) Date: Aug. 10, 2015

(87) PCT Pub. No.: WO2014/124364
PCT Pub. Date: Aug. 14, 2014

(65) Prior Publication Data
US 2015/0376481 A1    Dec. 31, 2015

Related U.S. Application Data

(60) Provisional application No. 61/763,123, filed on Feb. 11, 2013.

(51) Int. Cl.
| | | |
|---|---|---|
| *B05D 3/02* | (2006.01) | |
| *C08G 77/12* | (2006.01) | |
| *C08G 77/14* | (2006.01) | |
| *C08G 77/18* | (2006.01) | |
| *C08G 77/20* | (2006.01) | |
| *C08K 3/22* | (2006.01) | |
| *C08L 83/06* | (2006.01) | |
| *C08L 83/14* | (2006.01) | |
| *C09J 133/14* | (2006.01) | |
| *C09J 183/06* | (2006.01) | |
| *C09J 183/14* | (2006.01) | |

(52) U.S. Cl.
CPC .......... *C09J 183/06* (2013.01); *B05D 3/0272* (2013.01); *C08K 3/22* (2013.01); *C08L 83/06* (2013.01); *C08L 83/14* (2013.01); *C09J 133/14* (2013.01); *C09J 183/14* (2013.01); *C08G 77/12* (2013.01); *C08G 77/14* (2013.01); *C08G 77/18* (2013.01); *C08G 77/20* (2013.01); *C08K 2003/2265* (2013.01)

(58) Field of Classification Search
CPC ........ C08G 77/12; C08G 77/14; C08G 77/18; C08G 77/20; C09J 183/06; C09J 183/14; C09J 133/14; C08L 83/06; C08L 83/14; C08K 3/22; C08K 2003/2265; B05D 3/0272
See application file for complete search history.

(56) References Cited

U.S. PATENT DOCUMENTS

| | | | |
|---|---|---|---|
| 2,676,182 | A | 4/1954 | Daudt et al. |
| 3,159,601 | A | 12/1964 | Ashby |
| 3,220,972 | A | 11/1965 | Lamoreaux |
| 3,296,291 | A | 1/1967 | Chalk et al. |
| 3,337,510 | A | 8/1967 | Klebe |
| 3,419,593 | A | 12/1968 | Willing |
| 3,516,946 | A | 6/1970 | Modic |
| 3,714,109 | A | 1/1973 | Matherly et al. |
| 3,814,730 | A | 6/1974 | Karstedt |
| 3,989,668 | A | 11/1976 | Lee et al. |
| 4,087,585 | A | 5/1978 | Schults |
| 4,143,088 | A | 3/1979 | Farve et al. |
| 4,279,717 | A | 7/1981 | Eckberg et al. |
| 4,322,844 | A | 3/1982 | Fellinger et al. |
| 4,348,454 | A | 9/1982 | Eckberg |
| 4,611,042 | A | 9/1986 | Rivers-Farrell et al. |
| 4,681,963 | A | 7/1987 | Lewis |

(Continued)

FOREIGN PATENT DOCUMENTS

| | | | |
|---|---|---|---|
| EP | 0347895B A2 | | 12/1989 |
| EP | 0688847 | * | 12/1995 |

(Continued)

OTHER PUBLICATIONS

PCT/US2014/015571 ISR Dated Apr. 2, 2014.
Freeman (Silicones, Published for the Plastics Institute, ILIFFE Books Ltd., 1962, p. 27).
JP201184600A, published Apr. 28, 2011, machine translation.

*Primary Examiner* — Patrick Niland
(74) *Attorney, Agent, or Firm* — Matthew T. Fewkes

(57) ABSTRACT

A stable thermal radical curable silicone composition is provided that comprises (I) a clustered functional polyorganopolysiloxane having one or more radical curable groups selected from an acrylate group and a methacrylate group; (II) a reactive resin and polymer; (III) a radical initiator; (IV) a moisture cure initiator; and (V) a crosslinker. The reactive resin and polymer includes (a) an organopolysiloxane polymer and (b) an alkoxy-functional organopolysiloxane resin. The alkoxy-functional organopolysiloxane resin comprises the reaction product of a reaction of (i) an alkenyl-functional siloxane resin, (ii) an alkoxysilane-functional organosiloxane, and (iii) an endcapper in the presence of (iv) hydrosilylation catalyst. The stable thermal radical curable silicone composition can be utilized for electronics applications.

20 Claims, No Drawings

(56) References Cited

U.S. PATENT DOCUMENTS

| | | |
|---|---|---|
| 4,705,765 A | 11/1987 | Lewis |
| 4,726,964 A | 2/1988 | Isobe et al. |
| 4,737,562 A | 4/1988 | Chaudhury et al. |
| 4,742,103 A | 5/1988 | Morita et al. |
| 4,753,977 A | 6/1988 | Merrill |
| 4,766,176 A | 8/1988 | Lee et al. |
| 4,766,183 A | 8/1988 | Rizk et al. |
| 4,774,310 A | 9/1988 | Butler |
| 4,784,879 A | 11/1988 | Lee et al. |
| 4,962,076 A | 10/1990 | Chu et al. |
| 4,987,158 A | 1/1991 | Eckberg |
| 5,017,654 A | 5/1991 | Togahi et al. |
| 5,034,491 A | 7/1991 | Wewers et al. |
| 5,036,117 A | 7/1991 | Chung et al. |
| 5,051,455 A | 9/1991 | Chu et al. |
| 5,053,422 A | 10/1991 | Pinza et al. |
| 5,053,442 A | 10/1991 | Chu et al. |
| 5,057,476 A | 10/1991 | Saruyama et al. |
| 5,075,038 A | 12/1991 | Cole et al. |
| 5,175,325 A | 12/1992 | Brown et al. |
| 5,194,649 A | 3/1993 | Okawa |
| 5,198,476 A | 3/1993 | Kobayashi et al. |
| 5,200,543 A | 4/1993 | Inomata et al. |
| 5,248,715 A | 9/1993 | Gray et al. |
| 5,254,645 A | 10/1993 | King et al. |
| 5,298,589 A | 3/1994 | Buese et al. |
| 5,364,921 A | 11/1994 | Gray et al. |
| 5,397,813 A | 3/1995 | Eckberg et al. |
| 5,412,055 A | 5/1995 | Loo |
| 5,459,206 A | 10/1995 | Somemiya et al. |
| 5,473,026 A | 12/1995 | Strong et al. |
| 5,525,696 A | 6/1996 | Herzig et al. |
| 5,536,803 A | 7/1996 | Fujiki et al. |
| 5,545,831 A | 8/1996 | Kaiya et al. |
| 5,567,883 A | 10/1996 | Nara |
| 5,580,925 A | 12/1996 | Iwahara et al. |
| 5,691,435 A | 11/1997 | Herzig et al. |
| 5,696,209 A | 12/1997 | King et al. |
| 5,736,619 A | 4/1998 | Kane et al. |
| 5,744,507 A | 4/1998 | Angell et al. |
| 5,985,462 A | 11/1999 | Herzig et al. |
| 6,013,701 A | 1/2000 | Kunimatsu et al. |
| 6,030,919 A | 2/2000 | Lewis |
| 6,093,782 A | 7/2000 | Herzig et al. |
| 6,127,502 A | 10/2000 | Krahnke et al. |
| 6,160,150 A | 12/2000 | Krahnke et al. |
| 6,169,142 B1 | 1/2001 | Nakano et al. |
| 6,252,100 B1 | 6/2001 | Herzig |
| 6,297,340 B1 | 10/2001 | Tachikawa |
| 6,303,729 B1 | 10/2001 | Sato |
| 6,313,255 B1 | 11/2001 | Rubinsztajn |
| 6,349,312 B1 | 2/2002 | Fresko et al. |
| 6,777,512 B1 | 8/2004 | Sonnenschein et al. |
| 6,806,330 B1 | 10/2004 | Sonnenschein et al. |
| 7,026,399 B2 | 4/2006 | Kim et al. |
| 7,253,307 B1 | 8/2007 | Carlson, Jr. et al. |
| 7,378,482 B2 | 5/2008 | Asch et al. |
| 7,429,636 B2 | 9/2008 | Asch et al. |
| 7,432,338 B2 | 10/2008 | Chapman et al. |
| 7,440,536 B2 | 10/2008 | Bruder et al. |
| 7,449,536 B2 | 11/2008 | Chapman et al. |
| 7,687,585 B2 | 3/2010 | Karthauser |
| 7,700,712 B2 | 4/2010 | Zech et al. |
| 7,850,870 B2 | 12/2010 | Ahn et al. |
| 7,906,605 B2 | 3/2011 | Cray et al. |
| 7,932,319 B2 | 4/2011 | Yamamoto et al. |
| 8,110,630 B2 | 2/2012 | Lin et al. |
| 8,168,737 B2 | 5/2012 | Alvarez et al. |
| 8,580,073 B2 | 11/2013 | Behl et al. |
| 8,618,211 B2 | 12/2013 | Bhagwagar et al. |
| 8,889,261 B2 | 11/2014 | Carbary et al. |
| 9,045,647 B2 | 6/2015 | Kleyer et al. |
| 2003/0171487 A1 | 9/2003 | Ellsworth et al. |
| 2007/0289495 A1 | 12/2007 | Cray et al. |
| 2010/0092690 A1 | 4/2010 | Alvarez et al. |
| 2010/0183525 A1 | 7/2010 | Lin |
| 2012/0245272 A1 | 9/2012 | Dent et al. |

FOREIGN PATENT DOCUMENTS

| | | |
|---|---|---|
| GB | 1101167 | 1/1968 |
| JP | 201184600 | 4/2001 |
| WO | 9840425 A1 | 9/1998 |
| WO | 2004013403 | 2/2004 |
| WO | 2004037941 A2 | 5/2004 |
| WO | 2008133227 | 11/2008 |
| WO | 2008133228 | 11/2008 |
| WO | 2011056832 A1 | 5/2011 |
| WO | 2014124362 A1 | 8/2014 |
| WO | 2014124367 A1 | 8/2014 |
| WO | 2014124378 A1 | 8/2014 |
| WO | 2014124382 A1 | 8/2014 |
| WO | 2014124388 A1 | 8/2014 |
| WO | 2014124389 A1 | 8/2014 |

* cited by examiner

STABLE THERMAL RADICAL CURABLE SILICONE ADHESIVE COMPOSITIONS

CROSS REFERENCE TO RELATED APPLICATIONS

This application is a U.S. national stage filing under 35 U.S.C. §371 of PCT Application No. PCT/US14/015571 filed on 10 Feb. 2014, currently pending, which claims the benefit of U.S. Provisional Patent Application No. 61/763,123 filed 11 Feb. 2013 under 35 U.S.C. §119 (e). PCT Application No. PCT/US14/015571 and U.S. Provisional Patent Application No. 61/763,123 are hereby incorporated by reference.

The present invention relates generally to stable thermal radical curable silicone adhesive compositions, and, more specifically, to stable thermal radical curable silicone adhesive composition comprising: (I) a clustered functional polyorganosiloxane having at least one radical curable group selected from an acrylate group and a methacrylate group, (II) a reactive resin and polymer, (III) a radical initiator, (IV) a moisture cure initiator; and (V) a crosslinker.

Polyorganosiloxane compositions that cure to elastomeric materials are well known. Such compositions may be prepared by mixing polydiorganosiloxanes having curable (e.g., hydrolyzable, radiation curable, or heat curable) groups with crosslinking agents and/or catalysts, as needed. Generally, the polydiorganosiloxanes may have 1 to 3 reactive groups per chain end. Compositions including these components can then be cured, for example, by exposure to atmospheric moisture, exposure to radiation, or exposure to heat, depending on the curable groups present.

The cure rate of a particular composition depends on various factors including the type and number reactive group(s) present. It is known that different groups have different reactivities. For example, in the presence of moisture, a silicon-bonded acetoxy group will usually hydrolyze more rapidly than a silicon-bonded alkoxy group when all other conditions are the same. Furthermore, even the same type of curable group can have different reactivities depending on the number of those curable groups bonded to a particular silicon atom. For example, if a polydiorganosiloxane has three silicon-bonded alkoxy groups bonded to one silicon atom on a chain end, then the first alkoxy group is generally most reactive (reacts most quickly), but after the first alkoxy group reacts, it takes a longer time for the second alkoxy group bonded to the same silicon atom to react, and even longer for the third. Therefore, there is a continuing need to prepare clustered functional polyorganosiloxanes having more of the "most" reactive groups per molecular terminal.

Furthermore, to show utility for certain applications, such as silicone adhesive applications, a filler may be added to the composition to improve the physical property profile (e.g., increase tensile strength and increase % elongation to break) of the resulting cured product of the composition. The nature of the filler, its chemistry, particle size and surface chemistry have all been shown to influence the magnitude of the interaction between polyorganosiloxanes and the filler and consequently the ultimate physical properties. Other properties such as adhesion and dispensability also play a role in the performance and commercial acceptance of a composition for adhesive applications. Silicone adhesives generally have tensile properties in excess of 200 pounds per square inch (psi) and 100% elongation, with adhesion to a wide variety of metal, mineral and plastic surfaces.

The synthesis of 'dumb-bell' silicone polymers, in which long polymer chains are capped with cyclic, linear and star-shaped species having one or more organo-functional groups has been disclosed. Such polymers have been described which can undergo a number of cure chemistries, e.g., epoxy (glycidyl, alkylepoxy, and cycloaliphatic epoxy), methacrylate, acrylate, urethanes, alkoxy, or addition.

It is desirable to make multifunctional end blocked polymers (clustered functional polyorganosiloxanes) in which the curable groups are clustered at the ends/termini of the polymers. The combination of clustered functional groups with nonfunctional polymer chains separating them in the 'dumb-bell' silicone polymers may provide higher physical properties with the minimum drop in cure rate. This approach has been demonstrated for 'dumb-bell' silicone polymers in which the curable groups are the same (for example, all curable groups clustered at the polymer chain ends may be either epoxy or alkoxy). This approach has also been demonstrated for so called 'multiple cure' systems in which the curable groups differ, for example, all curable groups clustered at the polymer terminals may be a combination of epoxy and alkoxy groups.

It is also desirable to make adhesive systems including these clustered functional polyorganosiloxanes able to cure by more than one method of curing such that the adhesive products may be utilized on a wide variety of substrates without losing any mechanical or physical properties.

BRIEF SUMMARY OF THE INVENTION

The present invention discloses a stable thermal radical curable silicone adhesive composition comprising: (I) a clustered functional polyorganosiloxane having at least one radical curable group selected from an acrylate group and a methacrylate group, (II) a reactive resin and polymer, (III) a radical initiator, (IV) a moisture cure initiator; and (V) a crosslinker.

In certain embodiments, the reactive resin and polymer (II) comprises:

(a) an organopolysiloxane polymer of the formula $(R^7O)_{3-z}R^6_z Si-Q-(R^{25}_2 SiO_{2/2})_y-Q-Sir^6_z(OR^7)_{3-z}$, wherein each $R^{25}$ is independently a monovalent hydrocarbon radical having 1 to 6 carbon atoms, each $R^6$ independently is a monovalent hydrocarbon radical having 1 to 6 carbon atoms, each $R^7$ independently is selected from the group consisting of an alkyl radical and alkoxyalkyl radical, Q is a divalent linking radical, the subscript z has a value of 0, 1 or 2, and the subscript y has a value of 60 to 1000; and (b) an alkoxy-functional organopolysiloxane resin comprising a reaction product of a reaction of:

(i) an alkenyl-functional siloxane resin comprising $R^{26}_3 SiO_{1/2}$ units and $SiO_{4/2}$ units, wherein each $R^{26}$ is independently a monovalent hydrocarbon radical having 1 to 6 carbon atoms with the proviso that at least one $R^{26}$ is an alkenyl radical, wherein the molar ratio of the $R^{26}_3 SiO_{1/2}$ units to $SiO_{4/2}$ units has a value of from 0.5/1 to 1.5/1, (ii) an alkoxysilane-functional organosiloxane compound having at least one silicon-bonded hydrogen atom at a molecular terminal;

(iii) an endcapper;

in the presence of a (iv) hydrosilylation catalyst.

The stable thermal radical curable silicone adhesive composition offers many advantages over prior adhesive compositions due to its ability to cure by two distinct methods, namely moisture cure and thermal radical cure, without adversely affecting its mechanical and physical properties.

Thus, the stable thermal radical curable silicone adhesive composition may be used over a wider variety of substrates, including plastic substrates and metal substrates, and in a wide variety of application, such as in electronics applications. The reactive resin and polymer (II) also aids in dispensing the adhesive composition by making the stable thermal radical curable silicone adhesive composition more flowable, and thus it reduces stringing of the adhesive composition, for example, as it is dispensed through a fine tip applicator.

DETAILED DESCRIPTION OF THE INVENTION

The articles 'a', 'an', and 'the' each refer to one or more, unless otherwise indicated. All amounts, ratios, and percentages in this application are by weight, unless otherwise indicated. All kinematic viscosities were measured at 25° C., unless otherwise indicated.

The present invention describes curable silicone compositions, such as an adhesive or a sealant, that are curable by a heat curing mechanism such as thermal radical initiation and a room temperature curing mechanism such as condensation reaction or organoborane initiation (when an amine reactive compound is added instead of heat). The present invention may also use a radiation curing mechanism such as radiation radical initiation or redox reaction, or a combination thereof.

In certain embodiments, the curable silicone composition comprises (I) a clustered functional polyorganopolysiloxane; (II) a reactive resin and polymer; (III) a radical initiator; (IV) a moisture cure initiator; and (V) a crosslinker.

Component (I) is a clustered functional polyorganopolysiloxane.

In certain embodiments the clustered functional polyorganopolysiloxane (I) may be formed as the reaction product of a reaction of:
 a) a polyorganosiloxane having an average, per molecule, of at least 2 aliphatically unsaturated organic groups;
 b) a polyorganohydrogensiloxane having an average of 4 to 15 silicon atoms per molecule; and
 c) a reactive species having, per molecule, at least 1 aliphatically unsaturated organic group and 1 or more curable groups;
 in the presence of d) a hydrosilylation catalyst.

In certain embodiments, the weight percent of silicon bonded hydrogen atoms in the polyorganohydrogensiloxane b) divided by a weight percent of aliphatically unsaturated organic groups in the polyorganosiloxane a) (the $SiH_b/Vi_a$ ratio) ranges from 4/1 to 20/1.

The clustered functional polyorganosiloxane produced in accordance with the present invention may also include e) an isomer reducing agent, wherein the utilization of a sufficient amount of isomer reducing agent e) results in a reduction, such as at least a 10% reduction, in the amount of D(Oz) units present in the formed clustered functional polyorganosiloxane, as measured by NMR, which corresponds to a reduction, such as at least a 10% reduction, in the beta-addition of SiH groups of the polyorganosiloxane (ii) to the aliphatically unsaturated group of the reactive species c), as compared with clustered functional polyorganosiloxane formed in the absence of the isomer reducing agent e).

In certain embodiments, a first embodiment of the process for forming the clustered functional polyorganopolysiloxane (I) may comprise:

1) concurrently reacting components comprising
 a) a polyorganosiloxane having an average, per molecule, of at least 2 aliphatically unsaturated organic groups,
 b) a polyorganohydrogensiloxane having an average, per molecule, of 4 to 15 Si atoms and at least 4 silicon bonded hydrogen atoms per aliphatically unsaturated organic group in component a), and
 c) a reactive species having, per molecule, at least 1 aliphatically unsaturated organic group and 1 or more radical curable groups selected from acrylate groups and methacrylate groups;
 in the presence of d) a hydrosilylation catalyst.

In this process, the components in step 1) may further comprise f) a filler, g) a non-reactive silicone resin, or a combination thereof. The processes described above may optionally further comprise the steps of: 2) adding a catalyst inhibitor to deactivate the catalyst after step 1), and 3) purifying the product of step 2).

Alternatively, a second embodiment of the process for forming the clustered functional polyorganopolysiloxane (I) may comprise:

I) concurrently reacting components comprising
 a) the polyorganosiloxane having an average, per molecule, of at least 2 aliphatically unsaturated organic groups; and
 b) the polyorganohydrogensiloxane having an average, per molecule, of 4 to 15 Si atoms and at least 4 silicon bonded hydrogen atoms per aliphatically unsaturated organic group in component a),
 in the presence of d) the hydrosilylation catalyst; and thereafter II) reacting the product of step I) with an component comprising:
 c) the reactive species having, per molecule, at least 1 aliphatically unsaturated organic group and one or more radical curable groups selected from acrylate groups and methacrylate groups;
 with the proviso that the components in step I) and/or step II) further comprise f) a filler, g) a non-reactive silicone resin, or a combination thereof; and with the proviso that no intermediate purification step is performed between step I) and step II), and with the proviso that the $SiH_b/Vi_a$ ratio ranges from 4/1 to 20/1, and a product prepared by the process has, on average, more than one curable group at each molecular terminal of the polyorganosiloxane of component a).

The process may optionally further comprise the steps of: III) adding a catalyst inhibitor to deactivate the catalyst after step II), and IV) purifying the product of step III). The step of purifying the products in the above processes may be performed by any convenient means, such as stripping or distillation, optionally under vacuum.

In certain embodiments, the clustered functional organopolysiloxane (I), in combination with the filler f) or (XII) as described below, comprises from 50 to 95 weight percent, alternatively from 70 to 85 weight percent, of the total weight of the silicone adhesive composition.

Component a) is a polyorganosiloxane having an average, per molecule, of at least 2 aliphatically unsaturated organic groups, which are capable of undergoing a hydrosilylation reaction with a silicon bonded hydrogen atom of component b). Component a) may have a linear or branched structure. Alternatively, component a) may have a linear structure. Component a) may be a combination comprising two or more polyorganosiloxanes that differ in at least one of the following properties: structure, viscosity, degree of polymerization, and sequence.

Component a) has a minimum average degree of polymerization (average DP) of 100. Alternatively, average DP of component a) may range from 100 to 1000. The distribution DP of polyorganosiloxanes of component a) can be bimodal. For example, component a) may comprise one alkenyl terminated polydiorganosiloxane with a DP of 60 and another alkenyl terminated polydiorganosiloxane with a DP higher than 100, provided that average DP of the polydiorganosiloxanes ranges from 100 to 1000. However, suitable polyorganosiloxanes for use in component a) have a minimum degree of polymerization (DP) of 10, provided that polyorganosiloxanes with DP less than 10 are combined with polyorganosiloxanes having DP greater than 100. Suitable polydiorganosiloxanes for component a) are known in the art and are commercially available. For example, Dow Corning® SFD-128 has DP ranging from 800 to 1000, Dow Corning® SFD-120 has DP ranging from 600 to 700, Dow Corning® 7038 has DP of 100, and Dow Corning® SFD-119 has DP of 150. All of these are vinyl-terminated polydimethylsiloxanes are commercially available from Dow Corning Corporation of Midland, Mich., USA. When component a) has a bimodal distribution, the polyorganosiloxane with the lower DP (low DP polyorganosiloxane) is present in a lower amount than the polyorganosiloxane with the higher DP (high DP polyorganosiloxane). For example, in a bimodal distribution, the ratio of low DP polyorganosiloxane/high DP polyorganosiloxane may range from 10/90 to 25/75.

Component a) may be exemplified by polyorganosiloxanes of formula (I), formula (II), or a combination thereof. Formula (I) is $R^1_2R_2SiO(R^1_2SiO)_a(R^1R_2SiO)_bSiR^1_2R^2$, and formula (II) is $R^1_3SiO(R^1_2SiO)_c(R^1R^2SiO)_dSiR^1_3$. In these formulae, each $R^1$ is independently a monovalent organic group free of aliphatic unsaturation, each $R^2$ is independently an aliphatically unsaturated organic group, subscript a has an average value ranging from 2 to 1000, subscript b has an average value ranging from 0 to 1000, subscript c has an average value ranging from 0 to 1000, and subscript d has an average value ranging from 4 to 1000. In formulae (I) and (II), $10 \le (a+b) \le 1000$ and $10 \le (c+d) \le 1000$.

Suitable monovalent organic groups free of aliphatic unsaturation for $R^1$ include, but are not limited to, monovalent hydrocarbon groups exemplified by alkyl such as methyl, ethyl, propyl, butyl, pentyl, octyl, undecyl, and octadecyl; cycloalkyl such as cyclohexyl; and aryl such as phenyl, tolyl, xylyl, benzyl, and 2-phenylethyl. $R^2$ may be an aliphatically unsaturated monovalent hydrocarbon group exemplified by alkenyl groups such as vinyl, allyl, propenyl, and butenyl; and alkynyl groups such as ethynyl and propynyl.

Component a) may comprise a polydiorganosiloxane such as i) dimethylvinylsiloxy-terminated polydimethylsiloxane, ii) dimethylvinylsiloxy-terminated poly(dimethylsiloxane/methylvinylsiloxane), iii) dimethylvinylsiloxy-terminated polymethylvinylsiloxane, iv) trimethylsiloxy-terminated poly(dimethylsiloxane/methylvinylsiloxane), v) trimethylsiloxy-terminated polymethylvinylsiloxane, vi) dimethylvinylsiloxy-terminated poly(dimethylsiloxane/methylphenylsiloxane), vii) dimethylvinylsiloxy-terminated poly(dimethylsiloxane/diphenylsiloxane), viii) phenyl,methyl, vinyl-siloxy-terminated polydimethylsiloxane, ix) dimethylhexenylsiloxy-terminated polydimethylsiloxane, x) dimethylhexenylsiloxy-terminated poly(dimethylsiloxane/methylhexenylsiloxane), xi) dimethylhexenylsiloxy-terminated polymethylhexenylsiloxane, xii) trimethylsiloxy-terminated poly(dimethylsiloxane/methylhexenylsiloxane), or xiii) a combination thereof.

Component b) is a polyorganohydrogensiloxane having an average of 4 to 15 silicon atoms per molecule. Component b) has an average of at least 4 silicon bonded hydrogen atoms per aliphatically unsaturated organic group in component a). Component b) may be cyclic, branched, or linear. Alternatively, component b) may be cyclic. Component b) may be a combination comprising two or more polyorganohydrogensiloxanes that differ in at least one of the following properties: structure, viscosity, degree of polymerization, and sequence.

Component b) may be a cyclic polyorganohydrogensiloxane having an average of 4 to 15 siloxanes per molecule. The cyclic polyorganohydrogensiloxane may have formula (III), where formula (III) is $(R^3_2SiO_{2/2})_e(HR^3SiO_{2/2})_f$, in which each $R^3$ is independently a monovalent organic group free of aliphatic unsaturation, subscript e has an average value ranging from 0 to 10, subscript f has an average value ranging from 4 to 15, and a quantity (e+f) has a value ranging from 4 to 15, alternatively 4 to 12, alternatively 4 to 10, alternatively 4 to 6, and alternatively 5 to 6. Monovalent organic groups suitable for $R^3$ include, but are not limited to, monovalent hydrocarbon groups exemplified by alkyl such as methyl, ethyl, propyl, butyl, pentyl, octyl, undecyl, and octadecyl; cycloalkyl such as cyclohexyl; and aryl such as phenyl, tolyl, xylyl, benzyl, and 2-phenylethyl.

Alternatively, component b) may be a branched polyorganohydrogensiloxane. The branched polyorganohydrogensiloxane for component b) may have formula (IV), where formula (IV) is $Si-(OSiR^4_2)_g(OSiHR^4)_{g'}(OSiR^4_3)_h(OSiR^4_2H)_{(4-h)}$, in which each $R^4$ is independently a monovalent organic group free of aliphatic unsaturation, subscript g has a value ranging from 0 to 10, subscript g' has a value ranging from 0 to 10, and subscript h has a value ranging from 0 to 1.

Alternatively, subscript g may be 0. When subscript g' is 0, then subscript h is also 0. Monovalent organic groups suitable for $R^4$ include, but are not limited to, monovalent hydrocarbon groups exemplified by alkyl such as methyl, ethyl, propyl, butyl, pentyl, octyl, undecyl, and octadecyl; cycloalkyl such as cyclohexyl; and aryl such as phenyl, tolyl, xylyl, benzyl, and 2-phenylethyl.

Alternatively, component b) may be a linear polyorganohydrogensiloxane having an average of at least 4 silicon bonded hydrogen atoms per molecule. The linear polyorganohydrogensiloxane for component b) may have a formula selected from (V), (VI), or a combination thereof, where formula (V) is $R^5_2HSiO(R^5_2SiO)_i(R^5HSiO)_jSiR^5_2H$, formula (VI) is $R^5_3SiO(R^5_2SiO)_k(R^5HSiO)_m SiR^5_3$; where each $R^5$ is independently a monovalent organic group free of aliphatic unsaturation, subscript i has an average value ranging from 0 to 12, subscript j has an average value ranging from 2 to 12, subscript k has an average value ranging from 0 to 12, and subscript m has an average value ranging from 4 to 12 where $4 \le (i+j) \le 13$ and $4 \le (k+m) \le 13$. Monovalent organic groups suitable for R include, but are not limited to, monovalent hydrocarbon groups exemplified by alkyl such as methyl, ethyl, propyl, butyl, pentyl, octyl, undecyl, and octadecyl; cycloalkyl such as cyclohexyl; and aryl such as phenyl, tolyl, xylyl, benzyl, and 2-phenylethyl.

Component a) and component b) may be present in amounts sufficient to provide a weight percent of silicon bonded hydrogen atoms in component b) /weight percent of unsaturated organic groups in component a) (commonly referred to as $SiH_b/Vi_a$ ratio) ranging from 4/1 to 20/1, alternatively 4/1 to 10/1, and alternatively 5/1 to 20/1. Without wishing to be bound by theory, it is thought that if $SiH_b/Vi_a$ ratio is 30/1 or higher, the components may crosslink to form a product with undesirable physical properties; and if $SiH_b/Vi_a$ ratio is less than 4/1, the product of the process may not have sufficient clustered functional groups to have fast enough cure speed, particularly if a monofunctional reactive species (having one curable group per molecule) is used as component c).

Without wishing to be bound by theory, it is thought that using an excess of silicon bonded hydrogen atoms in component b), relative to aliphatically unsaturated organic groups in component a), may reduce the possibilities of producing high homologs of the clustered functional polyorganosiloxanes, which tend to be insoluble in, and may reduce storage life of, a curable silicone composition containing the clustered functional polyorganosiloxane prepared by the process described herein. The excess of silicon bonded hydrogen atoms in component b) may also result in small (relatively low DP) clustered functional polyorganosiloxanes, which may act as reactive diluents or viscosity modifiers and adhesion promoters. It is difficult to make these highly functional small molecules in an industrial environment because the inhibiting nature of small highly functional silicone hydrides means temperatures above 50° C. are typically required to initiate the hydrosilylation process. This is then followed by a large exotherm, which can be dangerous in the presence of large volumes of solvent, or if careful monitoring of reagents is not used to control the temperature. By simply changing the $SiH_b/Vi_a$ ratio, these species can be made in a dilute solution of clustered functional polyorganosiloxane and filler, thereby significantly reducing gelation and chance of fire due to uncontrolled exothermic reaction.

Component c) is a reactive species that may be any species that can provide the curable groups in the clustered functional polyorganosiloxane (i.e., in the reaction product of a reaction of components a), b) and c)). The reactive species has an average, per molecule, of at least one aliphatically unsaturated organic group that is capable of undergoing an addition reaction with a silicon bonded hydrogen atom of component b). Component c) further comprises one or more radical curable groups per molecule. The radical curable groups are functional (reactive) groups that render the clustered functional polyorganosiloxane (prepared by the process described above) radiation curable. The radical curable groups on component c) may be selected from acrylate groups and methacrylate groups and combinations thereof.

For example, component c) may comprise a silane of formula (VIII), where formula (VIII) is $R^8_o SiR^9_{(3-o)}$; in which subscript o has a value ranging from 1 to 3, each $R^8$ is independently an aliphatically unsaturated organic group, and each $R^9$ is independently selected from an organic group containing an acrylate group and a methacrylate group.

Alternatively, component c) may comprise an organic compound (which does not contain a silicon atom). The organic compound for component c) may have an average, per molecule, of 1 to 2 aliphatically unsaturated organic groups, such as alkenyl or alkynyl groups, and one or more reactive groups selected from an acrylate group and a methacrylate group. Examples of suitable organic compounds for component c) include, but are not limited to, allyl acrylate and allyl methacrylate (AMA) and combinations thereof.

The amount of component c) depends on various factors including the type, amount, and SiH content of component b) and the type of component c) selected. However, the amount of component c) is sufficient to make $SiH_{tot}/Vi_{tot}$ range from 1/1 to 1/1.4, alternatively 1/1.2 to 1.1/1. The ratio $SiH_{tot}/Vi_{tot}$ means the weight percent of silicon bonded hydrogen atoms on component b) and, if present component g) the chain extender and/or component h) the endcapper (described below), divided by the weight percent of aliphatically unsaturated organic groups on components a) and c) combined.

Component d) is a hydrosilylation catalyst which accelerates the reaction of components a), b), and c). Component d) may be added in an amount sufficient to promote the reaction of components a), b), and c), and this amount may be, for example, sufficient to provide 0.1 parts per million (ppm) to 1000 ppm of platinum group metal, alternatively 1 ppm to 500 ppm, alternatively 2 ppm to 200, alternatively 5 ppm to 20 ppm, based on the combined weight of all components used in the process.

Suitable hydrosilylation catalysts are known in the art and commercially available. Component d) may comprise a platinum group metal selected from platinum (Pt), rhodium, ruthenium, palladium, osmium or iridium metal or organometallic compound thereof, or a combination thereof. Component d) is exemplified by compounds such as chloroplatinic acid, chloroplatinic acid hexahydrate, platinum dichloride, and complexes of said compounds with low molecular weight organopolysiloxanes or platinum compounds microencapsulated in a matrix or coreshell type structure. Complexes of platinum with low molecular weight organopolysiloxanes include 1,3-diethenyl-1,1,3,3-tetramethyldisiloxane complexes with platinum. Alternatively, the catalyst may comprise 1,3-diethenyl-1,1,3,3-tetramethyldisiloxane complex with platinum. When the catalyst is a platinum complex with a low molecular weight organopolysiloxane, the amount of catalyst may range from 0.04% to 0.4% based on the combined weight of the components used in the process.

Suitable hydrosilylation catalysts for component d) are described in, for example, U.S. Pat. Nos. 3,159,601; 3,220,972; 3,296,291; 3,419,593; 3,516,946; 3,814,730; 3,989,668; 4,784,879; 5,036,117; and 5,175,325 and EP 0 347 895 B.

The components used in the process described above may optionally further comprise one or more additional components selected from e) an isomer reducing agent, f) a filler, g) a non-reactive resin, h) a chain extender, and i) an endcapper, or a combination thereof. Alternatively, the components used in the process may be components a), b), c) d), e) and f). Alternatively, the components used in the process may be components a), b), c) d), e), f) and h). Alternatively, the components used in the process may be components a), b), c) d), e), f) and i). Alternatively, the components used in the process may be components a), b), c) d), e), f), h) and i).

Component e) is an isomer reducing agent. In certain embodiments, the isomer reducing agent comprises a carboxylic acid compound. The carboxylic acid compound may comprise (1) carboxylic acid, (2) an anhydride of a carboxylic acid, (3) a carboxylic silyl ester, and/or (4) a substance that will produce the above-mentioned carboxylic acid compounds (i.e., (1), (2), and/or (3)) through a reaction or decomposition in the reaction of the method. It is to be appreciated that a mixture of one or more of these carboxylic acid compounds may be utilized as the isomer reducing agent. For example, a carboxylic silyl ester may be utilized in combination with an anhydride of a carboxylic acid as the isomer reducing agent. In addition, a mixture within one or more types of carboxylic acid compounds may be utilized as the isomer reducing agent. For example, two different carboxylic silyl esters may be utilized in concert, or two carboxylic silyl esters may be utilized in concert with an anhydride of a carboxylic acid.

When the isomer reducing agent e) comprises (1) carboxylic acid, any carboxylic acid having carboxyl groups may be utilized. Suitable examples of carboxylic acids include saturated carboxylic acids, unsaturated carboxylic acids, monocarboxylic acids, and dicarboxylic acids. A saturated or unsaturated aliphatic hydrocarbon group, aromatic hydrocarbon group, halogenated hydrocarbon group, hydrogen atom, or the like is usually selected as the portion other than the carboxyl groups in these carboxylic acids. Specific examples of suitable carboxylic acids include saturated monocarboxylic acids such as formic acid, acetic acid, propionic acid, n-butyric acid, isobutyric acid, hexanoic acid, cyclohexanoic acid, lauric acid, and stearic acid; saturated dicarboxylic acids such as oxalic acid and adipic acid; aromatic carboxylic acids such as benzoic acid and paraphthalic acid; carboxylic acids in which the hydrogen atoms of the hydrocarbon groups of these carboxylic acids have been substituted with a halogen atom or an organosilyl group, such as chloroacetic acid, dichloroacetic acid, trifluoroacetic acid, para-chlorobenzoic acid, and trimethylsilylacetic acid; unsaturated fatty acids such as acrylic acid, methacrylic acid, and oleic acid; and compounds having hydroxy groups, carbonyl groups, or amino groups in addition to carboxyl groups, namely, hydroxy acids such as lactic acid, keto acids such as acetoacetic acid, aldehyde acids such as glyoxylic acid, and amino acids such as glutamic acid.

When the isomer reducing agent e) comprises (2) an anhydride of carboxylic acid, suitable examples of anhydrides of carboxylic acids include acetic anhydride, propionic anhydride, and benzoic anhydride. These anhydrides of carboxylic acids may be obtained via a reaction or decomposition in the reaction system include acetyl chloride, butyryl chloride, benzoyl chloride, and other carboxylic acid halides, carboxylic acid metal salts such as zinc acetate and thallium acetate, and carboxylic esters that are decomposed by light or heat, such as (2-nitrobenzyl) propionate.

In embodiments where the isomer reducing agent e) comprises (3) a carboxylic silyl ester, suitable examples of carboxylic silyl esters are trialkylsilylated carboxylic acids, such as trimethylsilyl formate, trimethylsilyl acetate, triethylsilyl propionate, trimethylsilyl benzoate, and trimethylsilyl trifluoroacetate; and di-, tri-, or tetracarboxysilylates, such as dimethyldiacetoxysilane, diphenyldiacetoxysilane, methyltriacetoxysilane, ethyltriacetoxysilane, vinyltriacetoxysilane, di-t-butoxydiacetoxysilane, and silicon tetrabenzoate.

The isomer reducing agent e) is typically utilized in an amount ranging from 0.001 to 1 weight percent, alternatively from 0.01 to 0.1 weight percent, based on the total weight of the clustered functional polyorganopolysiloxane (I). Examples of commercially available carboxylic silyl esters suitable as the isomer reducing agent are DOW CORNING® ETS 900 or XIAMETER® OFS-1579 Silane, available from Dow Corning Corporation of Midland, Mich. Another exemplary isomer reducing agent is 2,6,-Di-tert-butyl-4-(dimethylaminomethyl)phenol (DBAP).

The isomer reducing agent e), added in a sufficient amount ranging from 0.001 to 1 weight percent as provided above, promotes the alpha-addition of the SiH groups of the polyorganosiloxane a) to the aliphatically unsaturated group of the reactive species c) over the beta-addition of the SiH groups of the polyorganosiloxane a) to the aliphatically unsaturated group of the reactive species c). The beta-position addition may result in the subsequent further reaction of the polyorganosiloxane a) to generate Si—OH and associated silicon hydroxide product (sometimes referred to as D(Oz) and/or T(Oz) units). Without being bound by any theory, it is believed that the generation of Si—OH hastens moisture cure of the polyorganosiloxanes. The relative amount of D(Oz) units generated, which correlate to the amount of beta-position addition of SiH groups of the polyorganosiloxane a) to the aliphatically unsaturated group of the reactive species c), may be measured by NMR.

The clustered functional polyorganosiloxane (I) produced in accordance with the present invention utilizing a sufficient amount of isomer reducing agent e) results in a reduction, and in certain embodiments at least a 10% reduction, in the amount of D(Oz) units present in the formed clustered functional polyorganosiloxane, as measured by NMR, which corresponds to a reduction, and in certain embodiments at least a 10% reduction, in the beta-addition of SiH groups of the polyorganosiloxane a) to the aliphatically unsaturated group of the reactive species c).

Component f) is a filler that may be added during the process described above. Fillers are exemplified by reinforcing and/or extending fillers such as, alumina, calcium carbonate (e.g., fumed, ground, and/or precipitated), diatomaceous earth, quartz, silica (e.g., fumed, ground, and/or precipitated), talc, zinc oxide, chopped fiber such as chopped KEVLAR®, or a combination thereof. The amount of filler will depend on various factors including the type of filler selected and the end use of the clustered functional polyorganosiloxane to be produced by the process. However, the amount of filler may be up to 20%, alternatively 1% to 20%, based on the combined weight of all the components. When the clustered functional polyorganosiloxane prepared by the process described above will be used in an adhesive composition, the amount of filler may range from 10% to 20%. Alternatively, when the clustered functional polyorganosiloxane will be used in a sealant composition, the amount of filler may range from 4% to 10%.

Without wishing to be bound by theory, it is thought that when the filler is added during the process described herein, this will provide an improvement in tensile properties as compared to a prior art process in which a conventional 'dumb-bell' type polyorganosiloxane is formed in a multiple step process, and thereafter a filler is dispersed. Therefore, the process described herein in the first embodiment may further comprise: mixing component f), a filler, with component a) before or during step 1) of the process described above. Alternatively, the process of the second embodiment may further comprise mixing f) a filler with component a) before or during step I) or mixing f) a filler with the components after step I) and before or during step II) of the process of the second embodiment described above.

The above process step of adding a filler may provide a benefit with many curable groups, however, adverse reactions with clustered functional polyorganosiloxanes (for example, containing hydrolyzable groups) may still be problematic. To combat this problem, the process of the first embodiment may further comprise: mixing f) a filler and f') a filler treating agent with component a) before or during step 1) of the process described above. Alternatively, the process of the second embodiment may further comprise mixing f) a filler and f') a filler treating agent with component a) before or during step I) or mixing f) a filler and f') a filler treating agent with the components after step I) and before or during step II) of the process of the second embodiment described above. The effective treatment of filler surfaces in situ as described above may require elevated temperature and/or vacuum conditions. These conditions may also be undesirable with thermally sensitive unsaturated functional groups and their oxygen enabled antioxidants. Therefore, the filler may be pretreated with the filler treating agent in the presence of component a) at elevated temperature and/or under vacuum. These filler treating conditions may be performed in a batch or continuous process as described, for example, in U.S. Pat. No. 6,013,701 to Kunimatsu, et al.

The resulting combination of treated filler in polyorganosiloxane is referred to as a masterbatch. Masterbatches are commercially available. The use of masterbatches allows the smooth reaction of the aliphatically unsaturated organic groups of component a) with the silicon bonded hydrogen atoms of component b) and unsaturated organic groups of component c) to be performed in a single, low shear step; leading to filled clustered functional polyorganosiloxanes with superior tensile and adhesive properties along with improved rheological and storage properties.

A masterbatch comprising a polyorganosiloxane having aliphatically unsaturated organic groups and a treated filler, with optionally a second polyorganosiloxane (having aliphatically unsaturated organic groups) of the same or differing molecular weight may be combined with components b) and c), and the resulting mixture may be sheared before addition of component d) at room temperature (RT). Reaction may then be initiated by raising the temperature to 50° C. to 100° C., alternatively 70° C. to 85° C., and maintaining the temperature until all of the SiH has reacted, as measured by the time needed for the SiH peak as observed by Fourier Transform Infra Red spectroscopy (FT-IR) at about 2170 $cm^{-1}$, to be reduced into the background of the spectra.

Due to the thermal stability of the aliphatically unsaturated polyorganosiloxanes and filler treating agents, these processes can be carried out at higher temperatures and shear, yielding stable, reproducible masterbatches of treated filler (such as silica) in aliphatically unsaturated polyorganosiloxane (polymer) such as vinyl endblocked PDMS. Not wanting to be constrained by theory, it is believed that exposing the polymer/filler interface to high temperature and shear, optimizes polymer/filler interactions and produces stable masterbatches. By using a masterbatch, one skilled in the art can formulate a curable silicone composition at low temperature and shear, which provides the benefit of making the process more widely applicable to prepare curable silicone compositions with different cure chemistries.

The filler treating agent may be a treating agent, which is known in the art. The amount of filler treating agent may vary depending on various factors including the type and amounts of fillers selected for component f) whether the filler is treated with filler treating agent in situ or pretreated before being combined with component a). However, the components may comprise an amount ranging from 0.1% to 2% of filler treating agent, based on the weight of the filler for component f).

The filler treating agent may comprise a silane such as an alkoxysilane, an alkoxy-functional oligosiloxane, a cyclic polyorganosiloxane, a hydroxyl-functional oligosiloxane such as a dimethyl siloxane or methyl phenyl siloxane, a stearate, or a fatty acid. The alkoxysilane may have the formula: $R^{10}_p Si(OR^{11})_{(4-p)}$, where subscript p is 1, 2, or 3; alternatively p is 3. Each $R^{10}$ is independently a monovalent organic group of 1 to 50 carbon atoms, such as a monovalent hydrocarbon group of 1 to 50 carbon atoms, alternatively 6 to 18 carbon atoms. Suitable monovalent hydrocarbon groups for $R^{10}$ are exemplified by alkyl groups such as hexyl, octyl, dodecyl, tetradecyl, hexadecyl, and octadecyl; and aromatic groups such as benzyl, phenyl and phenylethyl. $R^{10}$ can be a monovalent hydrocarbon group that is saturated or unsaturated and branched or unbranched. Alternatively, $R^{10}$ can be a saturated, unbranched, monovalent hydrocarbon group. Each $R^{11}$ may be a saturated hydrocarbon group of 1 to 4 carbon atoms, alternatively 1 to 2 carbon atoms.

Alkoxysilane filler treating agents are exemplified by hexyltrimethoxysilane, octyltriethoxysilane, decyltrimethoxysilane, dodecyltrimethoxysilane, tetradecyltrimethoxysilane, phenyltrimethoxysilane, phenylethyltrimethoxysilane, octadecyltrimethoxysilane, octadecyltriethoxysilane, and a combination thereof.

Alkoxy-functional oligosiloxanes can also be used as filler treating agents. For example, suitable alkoxy-functional oligosiloxanes include those of the formula $(R^{14}O)_q Si(OSiR^{12}_2 R^{13})_{(4-q)}$. In this formula, subscript q is 1, 2, or 3, alternatively q is 3. Each $R^{12}$ can be independently selected from saturated and unsaturated monovalent hydrocarbon groups of 1 to 10 carbon atoms. Each $R^{13}$ can be a saturated or unsaturated monovalent hydrocarbon group having at least 10 carbon atoms. Each $R^{14}$ can be an alkyl group.

Alternatively, alkoxysilanes may be used, but typically in combination with silazanes, which catalyze the less reactive alkoxysilane reaction with surface hydroxyls. Such reactions are typically performed above 100° C. with high shear with the removal of volatile by-products such as ammonia, methanol and water.

Alternatively, the filler treating agent can be any of the organosilicon compounds typically used to treat silica fillers. Examples of organosilicon compounds include, but are not limited to, organochlorosilanes such as methyltrichlorosilane, dimethyldichlorosilane, and trimethyl monochlorosilane; organosiloxanes such as hydroxy-endblocked dimethylsiloxane oligomer, hexamethyldisiloxane, and tetramethyldivinyldisiloxane; organosilazanes such as hexamethyldisilazane and hexamethylcyclotrisilazane; and organoalkoxysilanes such as methyltrimethoxysilane, $C_6H_{13}Si(OCH_3)_3$, $C_8H_{17}Si(OC_2H_5)_3$, $C_{10}H_{21}Si(OCH_3)_3$, $C_{12}H_{25}Si(OCH_3)_3$, $C_{14}H_{29}Si(OC_2H_5)_3$, and $C_6H_5CH_2CH_2Si(OCH_3)_3$, vinyltrimethoxysilane, vinyltriethoxysilane, 3-glycidoxypropyltrimethoxysilane, and 3-methacryloxypropyltrimethoxysilane.

Filler treating agents for thermally conductive fillers, such as alumina or passivated aluminum nitride, may include alkoxysilyl functional alkylmethyl polysiloxanes (e.g., partial hydrolysis condensate of $R^{27}_{oo} R^{28}_{pp} Si(OR^{29})_{(4-oo-pp)}$ or cohydrolysis condensates or mixtures), or similar materials where the hydrolyzable group may comprise silazane, acyloxy or oximo. In all of these, a group tethered to Si, such as $R^{27}$ in the formula above, is a long chain unsaturated monovalent hydrocarbon or monovalent aromatic-functional hydrocarbon. Each $R^{28}$ is independently a monovalent hydrocarbon group, and each $R^{29}$ is independently a monovalent hydrocarbon group of 1 to 4 carbon atoms. In the formula above, subscript oo is 1, 2, or 3 and subscript pp is 0, 1, or 2, with the proviso that a sum (oo+pp) is 1, 2, or 3.

Other filler treating agents include alkenyl functional polyorganosiloxanes. Suitable alkenyl functional polyorganosiloxanes include, but are not limited to:

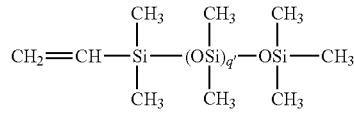

where subscript q' has a value up to 1,500. Other filler treating agents include mono-endcapped alkoxy functional polydiorganosiloxanes, i.e., polydiorganosiloxanes having an alkoxy group at one end. Such filler treating agents are exemplified by the formula: $R^{25}R^{26}{}_2SiO(R^{26}{}_2SiO)_{u'}Si(OR^{27})_3$, where subscript u' has a value of 0 to 100, alternatively 1 to 50, alternatively 1 to 10, and alternatively 3 to 6. Each $R^{25}$ is independently selected from an alkyl group, such as methyl, ethyl, propyl, butyl, hexyl, and octyl; and an alkenyl group, such as vinyl, allyl, butenyl, and Hex. Each $R^{26}$ is independently an alkyl group such as methyl, ethyl, propyl, butyl, hexyl, and octyl. Each $R^{27}$ is independently an alkyl group such as methyl, ethyl, propyl, and butyl. Alternatively, each $R^{25}$, each $R^{26}$, and each $R^{27}$ is methyl. Alternatively, each $R^{25}$ is vinyl. Alternatively, each $R^{26}$ and each $R^{27}$ is methyl.

Alternatively, a polyorganosiloxane capable of hydrogen bonding is useful as a treating agent. This strategy to treating surface of a filler takes advantage of multiple hydrogen bonds, either clustered or dispersed or both, as the means to tether the compatibilization moiety to the filler surface. The polyorganosiloxane capable of hydrogen bonding has an average, per molecule, of at least one silicon-bonded group capable of hydrogen bonding. The group may be selected from: an organic group having multiple hydroxyl functionalities or an organic group having at least one amino functional group. The polyorganosiloxane capable of hydrogen bonding means that hydrogen bonding is the primary mode of attachment for the polyorganosiloxane to a filler. The polyorganosiloxane may be incapable of forming covalent bonds with the filler. The polyorganosiloxane capable of hydrogen bonding may be selected from the group consisting of a saccharide-siloxane polymer, an amino-functional polyorganosiloxane, and a combination thereof. Alternatively, the polyorganosiloxane capable of hydrogen bonding may be a saccharide-siloxane polymer.

The non-reactive silicone resin g) useful herein contains monofunctional units represented by $R^{15}{}_3SiO_{1/2}$ and tetrafunctional units represented by $SiO_{4/2}$. $R^{15}$ represents a nonfunctional monovalent organic group such as a hydrocarbon group. The silicone resin is soluble in liquid hydrocarbons such as benzene, toluene, xylene, heptane and the like or in liquid organosilicon compounds such as a low viscosity cyclic and linear polydiorganosiloxanes.

In the $R^{15}{}_3SiO_{1/2}$ unit, $R^{15}$ may be a monovalent hydrocarbon group containing up to 20 carbon atoms, alternatively 1 to 10 carbon atoms. Examples of suitable monovalent hydrocarbon groups for $R^{15}$ include alkyl groups, such as methyl, ethyl, propyl, butyl pentyl, octyl, undecyl and octadecyl; cycloaliphatic radicals, such as cyclohexyl and cyclohexenylethyl; and aryl radicals such as phenyl, tolyl, xylyl, benzyl and 2-phenylethyl. Organic groups for $R^{15}$ are exemplified by the hydrocarbon groups above modified such that where a non-reactive substituent has replaced a hydrogen atom, for example, the nonreactive substituents may include but are not limited to halogen and cyano. Typical organic groups that can be represented by $R^{15}$ include but are not limited to chloromethyl and 3,3,3-trifluoropropyl.

The molar ratio of the $R^{15}{}_3SiO_{1/2}$ and $SiO_{4/2}$ units in the silicone resin may range from 0.5/1 to 1.5/1, alternatively from 0.6/1 to 0.9/1. These molar ratios are conveniently measured by Silicon 29 Nuclear Magnetic Spectroscopy ($^{29}Si$ NMR). This technique is capable of quantitatively determining the concentration of $R^{15}{}_3SiO_{1/2}$ ("M") and $SiO_{4/2}$ ("Q") units derived from the silicone resin, in addition to the total hydroxyl content of the silicone resin.

The silicone resin may further comprise 2.0% or less, alternatively 0.7% or less, alternatively 0.3% or less, of terminal units represented by the formula $XSiO_{3/2}$, where X represents hydroxyl or a hydrolyzable group exemplified by alkoxy such as methoxy and ethoxy. The concentration of hydrolyzable groups present in the silicone resin can be determined using FT-IR.

The weight average molecular weight, $M_w$, will depend at least in part on the molecular weight of the silicone resin and the type(s) of hydrocarbon groups, represented by $R^{15}$, that are present in this component. $M_w$ as used herein represents the molecular weight measured using gel permeation chromatography (GPC), when the peak representing the neopentamer is excluded form the measurement. The $M_w$ of the silicone resin may range from 12,000 to 30,000 g/mole, typically 17,000 to 22,000 g/mole.

The silicone resin can be prepared by any suitable method. Silicone resins of this type have been prepared by cohydrolysis of the corresponding silanes or by silica hydrosol capping methods known in the art. The silicone resin may be prepared by the silica hydrosol capping processes of Daudt, et al., U.S. Pat. No. 2,676,182; of Rivers-Farrell et al., U.S. Pat. No. 4,611,042; and of Butler, U.S. Pat. No. 4,774,310.

The intermediates used to prepare the silicone resin are typically triorganosilanes of the formula $R^{15}{}_3SiX'$, where X' represents a hydrolyzable group, and either a silane with four hydrolyzable groups such as halogen, alkoxy or hydroxyl, or an alkali metal silicate such as sodium silicate.

It is desirable that the silicon-bonded hydroxyl groups (i.e., $HOR^{15}SiO_{1/2}$ or $HOSiO_{3/2}$ groups) in the silicone resin be below 1.0% based on the total weight of the silicone resin, alternatively below 0.3%. Silicon-bonded hydroxyl groups formed during preparation of the silicone resin may be converted to trihydrocarbylsiloxy groups or a hydrolyzable group by reacting the silicone resin with a silane, disiloxane or disilazane containing the appropriate terminal group. Silanes containing hydrolyzable groups are typically added in excess of the quantity required to react with the silicon-bonded hydroxyl groups of the silicone resin.

Component h) is a chain extender. The chain extender may be a polydiorganosiloxane terminated at both ends with hydrogen atoms. An exemplary chain extender may have the formula (XVII): $HR^{16}{}_2Si—(R^{16}{}_2SiO)_r—SiR^{16}{}_2H$, where each $R^{16}$ is independently a monovalent hydrocarbon group exemplified by alkyl such as methyl, ethyl, propyl, butyl, pentyl, and hexyl; and aryl such as phenyl, tolyl, xylyl, and benzyl. Subscript r has an average value ranging from 0 to 400, alternatively 10 to 100.

Whether to use a chain extender, and the amount used when present, depends on various factors including the degree of crosslinking inherent in the system. For example, when starting with a polyorganosiloxane for component a) which has a relatively low average DP, e.g., average DP ranging from 60 to 400, then 50 mole % to 80 mole % of the SiH content in all of the components combined may come from the chain extender, alternatively 70 mole %. When using longer vinyl endblocked polymer (average DP>400) then lower levels are effective, e.g., 25 mole % to 50 mole % of SiH from chain extending molecules, preferably 40 mole %.

Component i) is an endcapper. The endcapper may be a polydiorganosiloxane having one silicon-bonded hydrogen atom per molecule. An exemplary endcapper may have the formula (XVIII), formula (XIX), or a combination thereof. Formula (XVIII) is $R^{17}{}_3SiO—(R^{17}{}_2SiO)_s—SiR^{17}{}_2H$. Each $R^{17}$ is independently a monovalent hydrocarbon group exemplified by alkyl such as methyl, ethyl, propyl, butyl, pentyl, and hexyl; and aryl such as phenyl, tolyl, xylyl and benzyl; and subscript s has a value ranging from 0 to 10, alternatively 1 to 10, and alternatively 1. Formula (XIX) is $R^{18}_3SiO-(R^{18}_2SiO)_t-(HR^{18}SiO)-SiR^{18}_3$. In this formula, each $R^{18}$ is independently a monovalent hydrocarbon group exemplified by alkyl such as methyl, ethyl, propyl, butyl, pentyl, and hexyl; and aryl such as phenyl, tolyl, xylyl and benzyl. Subscript t has a value ranging from 0 to 10, alternatively 0.

Alternatively, one of a chain extender or an endcapper is used; i.e., in this instance, the chain extender and the endcapper are not in combination with each other.

The endcapper may provide the benefit of producing a looser network of higher tensile properties when used as a mole percentage of the available SiH in the system. The amount of endcapper added may range from 0 to 15%, alternatively 2% to 15%, and alternatively 10%, based on the combined weight of all components used in the process.

A secondary benefit of having a chain extender or an endcapper in the process is initial reduction in viscosity prior to reaction, which may facilitate the reaction and reduce the tendency for gelation due to insufficient mixing and local gel formation. Using a chain extender or an endcapper may be especially beneficial when using relatively high molecular weight polyorganosiloxanes for component a) (e.g., average DP greater than 400) and when a filler is present.

The weight percent of silicon bonded hydrogen atoms in the components/weight percent of unsaturated organic groups capable of undergoing hydrosilylation in the components (commonly referred to as $SiH_{tot}/Vi_{tot}$ ratio) may range from 1/1.4 to 1/1, alternatively 1/1.2 to 1/1.1. In this ratio, $SiH_{tot}$ refers to the amount of silicon bonded hydrogen atoms in component b) in combination with the amount of silicon bonded hydrogen atoms in components h) and/or i), if present. $Vi_{tot}$ refers to the total amount of aliphatically unsaturated organic groups in components a) and c) combined.

Component j) is a catalyst inhibitor. Component j) may optionally be added after step 1) in the method of the first embodiment described above or after step II) in the method of the second embodiment described above to stop the reaction and stabilize the clustered functional polyorganosiloxane prepared by the process described above. Some examples of suitable catalyst inhibitors include ethylenically or aromatically unsaturated amides, acetylenic compounds such as 2-ethynyl-isopropanol, 2-ethynyl-butane-2-ol, 2-methyl-3-butyn-2-ol, 2-phenyl-3-butyn-2-ol, 3,5-dimethyl-1-hexyn-3-ol, 1-ethynyl-1-cyclohexanol, 1,5-hexadiene, 1,6-heptadiene; 3,5-dimethyl-1-hexen-1-yne; 3-ethyl-3-buten-1-yne or 3-phenyl-3-buten-1-yne; ethylenically unsaturated isocyanates; silylated acetylenic alcohols exemplified by trimethyl (3,5-dimethyl-1-hexyn-3-oxy)silane, dimethyl-bis-(3-methyl-1-butyn-oxy)silane, methylvinylbis (3-methyl-1-butyn-3-oxy)silane, and ((1,1-dimethyl-2-propynyl)oxy)trimethylsilane; unsaturated hydrocarbon diesters; conjugated ene-ynes exemplified by 2-isobutyl-1-butene-3-yne, 3,5-dimethyl-3-hexene-1-yne, 3-methyl-3-pentene-1-yne, 3-methyl-3-hexene-1-yne, 1-ethynylcyclohexene, 3-ethyl-3-butene-1-yne, and 3-phenyl-3-butene-1-yne; olefinic siloxanes such as 1,3-divinyltetramethyldisiloxane, 1,3,5,7-tetravinyltetramethyl cyclotetrasiloxane, or 1,3-divinyl-1,3-diphenyldimethyldisiloxane; 1,3,5,7-tetramethyl-1,3,5,7-tetravinylcyclotetrasiloxane; a mixture of a conjugated ene-yne as described above and an olefinic siloxane as described above; hydroperoxides; nitriles and diaziridines; unsaturated carboxylic esters exemplified by diallyl maleate, dimethyl maleate, diethyl fumarate, diallyl fumarate, and bis-2-methoxy-1-methylethylmaleate, mono-octylmaleate, mono-isooctylmaleate, mono-allyl maleate, mono-methyl maleate, mono-ethyl fumarate, mono-allyl fumarate, and 2-methoxy-1-methylethylmaleate; fumarates such as diethylfumarate; fumarate/alcohol mixtures wherein the alcohol is benzyl alcohol or 1-octanol and ethenyl cyclohexyl-1-ol; a nitrogen-containing compound such as tributylamine, tetramethylethylenediamine, benzotriazole; a similar phosphorus-containing compound such as triphenylphosphine; a sulphur-containing compound; a hydroperoxy compound; or a combination thereof.

The inhibitors are used in an amount effective to deactivate component d) the hydrosilylation catalyst. The amount will vary depending on the type and amount of catalyst and the type of inhibitor selected, however, the amount may range from 0.001 to 3 parts by weight, and alternatively from 0.01 to 1 part by weight per 100 parts by weight of component a).

Component (II) is reactive resin and polymer. The reactive resin and polymer (II) aids in dispensing the adhesive composition by make the adhesive composition more flowable, and thus it reduces stringing of the adhesive composition, for example, as it is dispensed through a fine tip applicator.

In certain embodiments, the reactive resin and polymer (II) comprises:

(a) an organopolysiloxane polymer of the formula $(OR)_{3-z}R^6_zSi-Q-(R^{25}_2SiO_{2/2})_y-Q-SiR^6_z(OR^7)_{3-z}$, wherein each $R^{25}$ is independently a monovalent hydrocarbon radical having 1 to 6 carbon atoms, each $R^6$ independently is a monovalent hydrocarbon radical having 1 to 6 carbon atoms, each $R^7$ independently is selected from the group consisting of an alkyl radical and alkoxyalkyl radical, Q is a divalent linking radical, the subscript z has a value of 0, 1 or 2, and the subscript y has a value of 60 to 1000; and (b) an alkoxy-functional organopolysiloxane resin comprising the reaction product of:

(i) an alkenyl-functional siloxane resin comprising $R^{26}_3SiO_{1/2}$ units and $SiO_{4/2}$ units, wherein each $R^{26}$ is independently a monovalent hydrocarbon radical have 1 to 6 carbon atoms with the proviso that at least one $R^{26}$ is an alkenyl radical, wherein the molar ratio of the $R^{26}_3SiO_{1/2}$ units to $SiO_{4/2}$ units has a value of from 0.5/1 to 1.5/1, (ii) an alkoxysilane-functional organosiloxane compound having at least one silicon-bonded hydrogen atom at a molecular terminal;

(iii) an endcapper;

in the presence of a (iv) hydrosilylation catalyst.

In certain embodiments, the weight ratio of the polymer (a) to resin (b) in the reactive resin and polymer (II) varies from 75/25 to 35/65.

The organopolysiloxane polymer (a), as noted above, comprises the formula $(R^7O)_{3-z}R^6_zSi-Q-(R^{25}_2SiO_{2/2})_y-Q-SiR^6_z(OR^7)_{3-z}$, wherein each R is independently a monovalent hydrocarbon radical having 1 to 6 carbon atoms, each $R^6$ independently is a monovalent hydrocarbon radical having 1 to 6 carbon atoms, each $R^7$ independently is selected from the group consisting of an alkyl radical and alkoxyalkyl radical, Q is a divalent linking radical, the subscript z has a value of 0, 1 or 2, and the subscript y has a value of 60 to 1000.

The Q radical is a divalent linking radical linking the silicon atom of the curing radical to a silicon atom of the resin. Q is typically selected from the types of divalent radicals that are used to link silicon atoms in a hydrolytically stable manner and include, but are not limited to, hydrocarbons such as alkylene, for example ethylene, propylene, and isobutylene and phenylene; siloxanes such as, for example, polydimethylsiloxane; and combinations thereof. Preferably, the number of carbon atoms in the Q divalent linking radical numbers from 2 to 12, alternatively 2, and the number of siloxane repeat units in the Q divalent linking radical numbers from 0 to 20, alternatively 2.

As noted above, the alkoxy-functional organopolysiloxane resin (b) includes an alkenyl-functional siloxane compound (i) which, in certain embodiments, includes a resinous portion wherein the $R^{26}_3SiO_{1/2}$ units (i.e., M units) are bonded to the $SiO_{4/2}$ units (i.e., Q units), each of which is bonded to at least one other $SiO_{4/2}$ unit. In the $R^{26}_3SiO_{1/2}$ units, each $R^{26}$ is individually a monovalent hydrocarbon radical having less than 6 carbon atoms, with the proviso that at least one $R^{26}$ is an alkenyl radical. Examples of suitable $R^{26}$ radicals include alkyl radicals, such as methyl, ethyl, propyl, and pentyl; alkenyl radicals, such as vinyl, alkyl, and 5-hexenyl; and aryl radicals such as phenyl.

At least one third, and more preferably substantially all $R^{26}$ radicals, are methyl radicals, with the proviso that at least one R radical is an alkenyl radical, and further with the proviso that the resin (i) includes from 0.5 to 4 weight percent, alternatively from 1.0 to 2.2 weight percent, alkenyl-functionality, based on the total weight of the resin (i). Stated differently, the alkenyl radical content of the resin (i) is from 0.05 to 4 weight percent of the total weight of the resin (i). Examples of preferred $R^{26}_3SiO_{1/2}$ units having methyl radicals include $Me_3SiO_{1/2}$ units and $PhMe_2SiO_{1/2}$ units, wherein Me is methyl and Ph is phenyl.

In addition, it is preferable that the hydroxyl content of the resin (i) is less than 1 weight percent of the total weight of the resin (i).

For the purposes of the present invention, the ratio of $R^{26}_3SiO_{1/2}$ units to $SiO_{4/2}$ units in resin (i) has a molar ratio of 0.5:1 to 1.5:1, respectively. It is preferred that the molar ratio of the total M units to total Q units of the resin (i) be between 0.6:1 and 1.0:1. The above M/Q molar ratios can be easily obtained by $^{29}Si$ nuclear magnetic resonance (NMR) spectroscopy.

The resin (i) preferably has a weight average molecular weight Mw from 12,000 to 30,000 g/mole, typically between 17,000 and 22,000 g/mole.

As noted above, the alkoxy-functional organopolysiloxane resin (b) also includes an alkoxysilane-functional organosiloxane compound having at least one silicon-bonded hydrogen atom at a molecular terminal (ii) which, in certain embodiments, is of the general formula $HSi(R^{27})_2OSi(R^{27})_2CH_2CH_2SiR^{27}_{zz}(OR)_{3-zz}$ wherein each $R_{27}$ is independently a monovalent hydrocarbon having 1 to 6 carbon atoms and wherein the subscript zz is 0 or 1.

Even more preferably, the alkoxysilane-functional organosiloxane compound having at least one silicon-bonded hydrogen atom at a molecular terminal (ii) is of the general formula $HSi(Me)_2OSi(Me)_2CH_2CH_2Si\ (OMe)_3$, wherein Me is methyl.

As noted above, the alkoxy-functional organopolysiloxane resin (b) also includes an endcapper (iii). The endcapper (iii) is the same endcapper described previously as component i) in the clustered functional polyorganosiloxane (I) above and preferably is of the formula (XVIII), formula (XIX), or a combination thereof.

As noted above, the alkoxy-functional organopolysiloxane resin and polymer includes a hydrosilylation catalyst (iv) which accelerates the reaction of components (i)-(iii).

Component (iv) may be added in an amount sufficient to promote the reaction of components (i)-(iii), and this amount may be, for example, sufficient to provide 0.1 parts per million (ppm) to 1000 ppm of platinum group metal, alternatively 1 ppm to 500 ppm, alternatively 2 ppm to 200, alternatively 5 ppm to 150 ppm, based on the combined weight of all components used in the process.

Suitable hydrosilylation catalysts are known in the art and commercially available. Component (iv) may comprise a platinum group metal selected from platinum (Pt), rhodium, ruthenium, palladium, osmium or iridium metal or organometallic compound thereof, or a combination thereof. Component (iv) is exemplified by compounds such as chloroplatinic acid, chloroplatinic acid hexahydrate, platinum dichloride, and complexes of said compounds with low molecular weight organopolysiloxanes or platinum compounds microencapsulated in a matrix or coreshell type structure. Complexes of platinum with low molecular weight organopolysiloxanes include 1,3-diethenyl-1,1,3,3-tetramethyldisiloxane complexes with platinum. Alternatively, the catalyst may comprise 1,3-diethenyl-1,1,3,3-tetramethyldisiloxane complex with platinum. When the catalyst is a platinum complex with a low molecular weight organopolysiloxane, the amount of catalyst may range from 0.04% to 0.4% based on the combined weight of the components used in the process.

Suitable hydrosilylation catalysts for component (iv) are described in, for example, U.S. Pat. Nos. 3,159,601; 3,220,972; 3,296,291; 3,419,593; 3,516,946; 3,814,730; 3,989,668; 4,784,879; 5,036,117; and 5,175,325 and EP 0 347 895 B.

In certain other embodiments, the reactive resin and polymer (II) ranges from 5 to 50 weight percent, alternatively from 15 to 35 weight percent, of the total weight of the silicone adhesive composition.

Component (III) is a radical initiator. The radical initiator may be a thermal radical initiator. Thermal radical initiators include, but are not limited to, dicumyl peroxide, n-butyl 4,4'-bis(butylperoxy)valerate, 1,1-bis(t-butylperoxy)-3,3,5 trimethyl cyclohexane, di-t-butyl peroxide and 2,5-di-(t-butylperoxy)-2,5 dimethyl hexane, 1,1-bis(tert-amylperoxy)cyclohexane (Luperox® 531M80); 2,2-bis(tert-butylperoxy)butane; 2,4-pentanedione peroxide (Luperox® 224), 2,5-bis (tert-butylperoxy)-2,5-dimethylhexane (Luperox® 101), 2,5-di(tert-butylperoxy)-2,5-dimethyl-3-hexyne; 2-butanone peroxide, benzoyl peroxide, cumene hydroperoxide, di-tert-amyl peroxide (Luperox® DTA®), lauroyl peroxide (Luperox® LP), tert-butyl hydroperoxide; tert-butyl peracetate; tert-butyl peroxybenzoate; tert-butylperoxy 2-ethylhexyl carbonate; di(2,4-dichlorobenzoyl) peroxide; dichlorobenzoylperoxide (available as Varox® DCBP from R. T. Vanderbilt Company, Inc. of Norwalk, Conn., USA); di(tert-butylperoxyisopropyl)benzene, di(4-methylbenzoyl) peroxide, butyl 4,4-di(tert-butylperoxy)valerate, 3,3,5,7,7-pentamethyl-1,2,4-trioxepane; tert-butyl peroxy-3,5,5-trimethylhexanoate; tert-butyl cumyl peroxide; di(4-tert-butylcyclohexyl) peroxydicarbonate (available as Perkadox 16); dicetyl peroxydicarbonate; dimyristyl peroxydicarbonate; 2,3-dimethyl-2,3-diphenylbutane, dioctanoyl peroxide; tert-butylperoxy 2-ethylhexyl carbonate; tert-amyl peroxy-2-ethylhexanoate, tert-amyl peroxypivalate; and combinations thereof.

Examples of such thermal radical initiators are commercially available under the following trade names: Luperox® sold by Arkema, Inc. of Philadelphia, Pa., U.S.A.; Trigonox and Perkadox sold by Akzo Nobel Polymer Chemicals LLC of Chicago, Ill., U.S.A., VAZO sold by E.I. duPont deNemours and Co. of Wilmington, Del., U.S.A; VAROX® sold by R.T. Vanderbilt Company, Inc. of Norwalk, Conn., U.S.A.; and Norox sold by Syrgis Performance Initiators, Inc. of Helena, Ark., U.S.A.

Alternatively, the curing agent may comprise a room temperature radical initiator such as an organoborane-amine complex. The organoborane amine complex is a complex formed between an organoborane and a suitable amine compound that renders the complex stable at ambient conditions. The complex should be capable of initiating polymerization or crosslinking of component (I) by the introduction of an amine reactive compound and/or by heating. An example is an alkylborane amine complex formed from trialkylboranes and various amine compounds. While the preferred molar ratio can vary, the optimal molar ratio may range from 1 to 10 nitrogen groups per B atom where B represents boron. Examples of trialkylboranes useful for forming the curing agent include trialkylboranes of the formula B—R"$_3$ where R" represents linear and branched aliphatic or aromatic hydrocarbon groups containing 1 to 20 carbon atoms. Some examples include trimethylborane, tri-n-butylborane, tri-n-octylborane, tri-sec-butylborane, tridodecylborane, and phenyldiethylborane.

Some examples of amine compounds useful to form the organoborane amine complex with the organoborane compounds include 1,3 propane diamine, 1,6-hexanediamine, methoxypropylamine, pyridine, and isophorone diamine. Other examples of amine compounds useful to form organoborane amine complexes are described in U.S. Pat. No. 6,777,512 (the '512 patent), as well as in U.S. Pat. No. 6,806,330.

Silicon containing amine compounds can also be used to form the organoborane amine complex including compositions such as 3-aminopropyltrimethoxysilane, aminomethyltrimethoxysilane, 3-aminopropyltriethoxysilane, aminomethyltriethoxysilane, 2-(trimethoxysilylethyl)pyridine, aminopropylsilanetriol, 3-(m-aminophenoxy)propyltrimethoxysilane, 3-aminopropyldiisopropylmethoxysilane, aminophenyltrimethoxysilane, 3-aminopropyltris(methoxyethoxethoxy)silane, N-(2-aminoethyl)-3-aminopropyltrimethoxysilane, N-(2-aminoethyl)aminomethyltrimethoxysilane, N-(6-aminohexyl)aminomethyltrimethoxysilane, N-(2-aminoethyl)-11-aminoundecyltrimethoxysilane, (aminoethylaminomethyl)phenethyltrimethoxysilane, N-(2-aminoethyl)-3-aminopropylmethyldimethoxysilane, N-(2-aminoethyl)-3-aminoisobutylmethyldimethoxysilane, and (3-trimethoxysilylpropyl)diethylene-triamine.

Amine functional polyorganosiloxanes are also useful for forming the organoborane amine complex including amine functional polydiorganosiloxanes, and amine functional polyorganosiloxane resins. This is subject to the stipulation that the molecule contain at least one amine-functional group, such as 3-aminopropyl, 2-aminoethyl, aminomethyl, 6-aminohexyl, 11-aminoundecyl, 3-(N-allylamino)propyl, N-(2-aminoethyl)-3-aminopropyl, N-(2-aminoethyl)-3-aminoisobutyl, p-aminophenyl, 2-ethylpyridine, and 3-propylpyrrole.

Specific examples include terminal and/or pendant amine-functional polydimethylsiloxane oligomers and polymers, terminal and/or pendant amine-functional random, graft and block copolymers and co-oligomers of polydimethylsiloxane and poly(3,3,3 trifluoropropyl-methylsiloxane), terminal and/or pendant amine-functional random, graft and block copolymers and co-oligomers of polydimethylsiloxane and poly(6,6,6,5,5,4,4,3,3-nonfluorohexyl-methylsiloxane), and terminal and/or pendant amine-functional random, graft and block copolymers and co-oligomers of polydimethylsiloxane and polyphenylmethylsiloxane.

Also useful to form the organoborane amine complex are other nitrogen containing compounds including N-(3-triethyoxysilylpropyl)-4,5-dihydroimidazole, ureidopropyltriethoxysilane, nitrogen containing polyorganosiloxanes, and polyorganosiloxane resins in which at least one group is an imidazole, amidine, or ureido functional group. When the amine compound is polymeric, the molecular weight is not limited, except that it should be such as to maintain a sufficiently high concentration of boron to permit curing or polymerization of the composition. For example, in a two-part composition, the part containing the organoborane initiator may be diluted with other components of the composition, or it may consist of the initiator complex alone.

When an organoborane amine complex is used as the curing agent, the curable silicone composition may further comprise an amine reactive compound that is capable of initiating the polymerization or crosslinking of the composition when mixed with the organoborane amine complex and exposed to an oxygenated environment. The presence of the amine reactive compound allows the initiation of polymerization or crosslinking to occur at temperatures below the dissociation temperature of the organoborane amine complex including room temperature and below. To achieve storage stability in the presence of oxygen, the organoborane amine complex and the amine reactive compound may be physically or chemically isolated. For example, a composition containing an amine reactive compound can be rendered air stable by packaging it separately from the organoborane amine complex as a multiple-part composition. Alternatively, the organoborane amine complex, the amine reactive compound, or both can be encapsulated, or delivered in separate phases. This can be accomplished by introducing one or both of the organoborane amine complex, the amine reactive compound in a solid form that prevents intimate mixing of the organoborane amine complex, the amine reactive compound. Curing of the composition can be activated by (a) heating it above the softening temperature of the solid phase component or encapsulant, or (b) by introduction of a solubilizing agent that allows mixing of the organoborane amine complex, the amine reactive compound. The organoborane amine complex, the amine reactive compound can also be combined in a single container without significant polymerization or crosslinking by packaging the two components in a container where mixing conditions are anaerobic.

Examples of some amine reactive compounds having amine reactive groups that can rapidly initiate polymerization or cure in the presence of oxygen include mineral acids, Lewis acids, carboxylic acids, carboxylic acid derivatives such as anhydrides and succinates, carboxylic acid metal salts, isocyanates, aldehydes, epoxides, acid chlorides, and sulphonyl chlorides. Some suitable amine reactive compounds include acrylic acid, polyacrylic acid, methacrylic acid, polymethacrylic acid, methacrylic anhydride, polymethacrylic anhydride, undecylenic acid, oleic acid, isophorone diisocyanate, methacryloylisocyanate, 2-(methacryloyloxy)ethyl acetoacetate, undecylenic aldehyde, and dodecyl succinic anhydride.

For improved compatibility in curable silicone compositions the amine reactive compound may be an organosilane or organopolysiloxane bearing amine reactive groups. Some examples include 3-isocyanatopropyltrimethoxysilane; isocyanatomethyltrimethoxysilane; 3-glycidoxypropyltrimethoxysilane; triethoxysilylpropyl succinic anhydride; propylsuccinic anhydride functionalized linear, branched, resinous, and hyperbranched organopolysiloxanes; methylsuccinic anhydride functionalized linear, branched, resinous, and hyperbranched organopolysiloxanes; cyclohexenyl anhydride functional linear, resinous, and hyperbranched organopolysiloxanes; carboxylic acid functionalized linear, branched, resinous, and hyperbranched organopolysiloxanes such as carboxydecyl terminated oligomeric or polymeric polydimethylsiloxanes; and aldehyde functionalized linear, branched, resinous, and hyperbranched organopolysiloxanes such as undecylenic aldehyde-terminated oligomeric or polymeric polydimethylsiloxanes. The '512 patent describes silicon containing compounds that can be used including certain compounds that release an acid when exposed to moisture. The '512 patent also describes other amine reactive compounds referred to as decomplexation agents. Alternatively, the decomplexation agent may be selected from acids, anhydrides, isocaynates, or epoxies. Specific examples include 3-(triethoxysilyl)propylsuccinicanhydride, nonenyl succinic anhydride, acetic acid, 2-carboxyethylacrylate, ethylene glycol methacrylate phosphate, and acrylic acid.

Alternatively, the room temperature radical initiator comprises a redox reagent as an initiator for radical polymerization. The reagent may be a combination of a peroxide and an amine or a transition metal chelate. The redox reagent is exemplified by, but not limited to, diacyl peroxides such as benzoyl peroxide and acetyl peroxide; hydroperoxides such as cumene hydroperoxide and t-butyl hydroperoxide; ketone peroxides such as methyl ethyl ketone peroxide and cyclohexanone peroxide; dialkyl peroxides such as dicumyl peroxide and ti-t-butyl peroxide; peroxy esters such as t-butyl peroxy acetate; and combinations of thioglycerol and pyrazoles and/or pyrazolones. Alternatively, the redox reagent may be exemplified by dimethylaniline, 3,5-dimethylpyrazole, thioglycerol; and combinations thereof. Examples of suitable redox reagent initiators are known in the art and are exemplified as in U.S. Pat. No. 5,459,206. Other suitable peroxides are known in the art and are commercially available such as lauroyl peroxide (Luperox® LP from Arkema), dichlorobenzoylperoxide (Varox® DCBP from R. T. Vanderbilt Company, Inc.) and 6N tert-butyl hydroperoxide.

The concentration of the radical initiator (III) may range from 0.01% to 15%, alternatively from 0.1% to 5%, and alternatively 0.1% to 2%, based on the weight of the clustered functional polyorganosiloxane (I).

Component (IV) is a moisture cure initiator (i.e., a condensation catalyst or condensation reaction catalyst). Examples of condensation reaction catalysts are known in the art and are disclosed in U.S. Pat. Nos. 4,962,076; 5,051,455; 5,053,442; 4,753,977 at col. 4, line 35 to col. 5, line 57; and 4,143,088 at col. 7, line 15 to col. 10, line 35. The amount of the condensation reaction catalyst depends on various factors including the type of catalyst selected and the choice of the remaining components in the composition, however the amount of the condensation reaction catalyst may range from 0.001% to 5% based on the weight of the reactive resin and polymer (II).

Suitable condensation reaction catalyst may be a Lewis acid; a primary, secondary, or tertiary organic amine; a metal oxide; a titanium compound; a tin compound; a zirconium compound; or a combination thereof. The condensation reaction catalyst may comprise a carboxylic acid salt of a metal ranging from lead to manganese inclusive in the electromotive series of metals. Alternatively, the condensation reaction catalyst may comprise a chelated titanium compound, a titanate such as a tetraalkoxytitanate, a titanium ester, or a combination thereof. Examples of suitable titanium compounds include, but are not limited to, diisopropoxytitanium bis(ethylacetoacetate), tetrabutoxy titanate, tetrabutyltitanate, tetraisopropyltitanate, and bis-(ethoxyacetoacetonate)diisopropoxy titanium (IV), and a combination thereof. Alternatively the condensation reaction catalyst may comprise a tin compound such as dibutyltin diacetate; dibutyltin dilaurate; dibutyl tin oxide; stannous octoate; tin oxide; a titanium ester, such as tetrabutyl titanate, tetraethylhexyl titanate and tetraphenyltitanate; a siloxytitanate, such as tetrakis(trimethylsiloxy)titanium and bis(trimethylsiloxy)-bis(isopropoxy)titanium; and a betadicarbonyltitanium compound, such as bis(acetylacetonyl)diisopropyl titanate; or a combination thereof. Alternatively, the condensation reaction catalyst may comprise an amine, such as hexylamine; or an acetate or quat salt of an amine.

Component (V) is a crosslinker. The type and amount of crosslinker will depend on various factors including the type and amount of curable groups based on the reactive resin and polymer (II).

In certain embodiments, the crosslinker is a condensation reaction crosslinker that may be selected from, for example, trialkoxysilanes exemplified by propyltrimethoxysilane, phenyltrimethoxysilane, glycidoxypropyltrimethoxysilane, ethyltrimethoxysilane, aminopropyltrimethoxysilane, aminoethylaminopropyltrimethoxysilane, methyltrimethoxysilane, phenyl trimethoxysilane, and methyltriethoxysilane; acetoxysilanes such as methyltriacetoxysilane or ethyltriacetoxysilane; ketoximosilanes such as methyltri (methylethylketoximo)silane, tetra(methylethylketoximo) silane, methyltris(methylethylketoximo)silane, and vinyltris (methylethylketoximo) silane; alkyl orthosilicates such as tetraethyl orthosilicate, tetramethoxysilane, tetraethoxysilane, and condensation products of these orthosilicates, which are typically referred to as alkyl polysilicates; methylvinyl bis(n-methylacetamido) silane; and a combination thereof.

In certain embodiments, the amount of crosslinker utilized in the silicone adhesive composition is dependent upon numerous factors, but is based primarily upon the type and amount of curable groups contained in components (I) and (II). In certain embodiments, the amount of crosslinker is from 0.1 to 10 weight percent, such as from 0.5 to 3 weight percent, based upon the total weight of the reactive resin and polymer (II).

The curable silicone composition may optionally further comprise one or more additional components. The additional components are exemplified by (VI) a solvent, (VII) an adhesion promoter, (VIII) a colorant, (IX) a reactive diluent, (X) a corrosion inhibitor, (XI) a polymerization inhibitor, and a combination thereof. The curable silicone composition may optionally further comprise (XII) a filler, (XIII) a filler treating agent, (XIV) an acid acceptor; and a combination thereof, for example, if a filler f) has not been added during the process for making the clustered functional polyorganosiloxane, or if more or a different filler is desired to formulate, e.g., the filler (XII) to be added is a thermally conductive filler, described below.

Component (VI) is a solvent. Suitable solvents are exemplified by organic solvents such as toluene, xylene, acetone, methylethylketone, methyl isobutyl ketone, hexane, heptane, alcohols such as decyl alcohol or undecyl alcohol, and a combination thereof; and non-crosslinkable silicone solvents such as trimethylsiloxy-terminated polydimethylsiloxanes, trimethylsiloxy-terminated polymethylphenylsiloxanes, and a combination thereof. Examples of silicone solvents are known in the art and are commercially available, for example, as Dow Corning® OS Fluids from Dow Corning Corporation of Midland, Mich., U.S.A. The amount of component (IV) may range from 0.001% to 90% based on the weight of the curable silicone composition.

Component (VII) is an adhesion promoter. Examples of suitable adhesion promoters include an alkoxysilane such as an epoxy-functional alkoxysilane, or a mercapto-functional compound; a combination of an alkoxysilane and a hydroxy-functional polyorganosiloxane; a mercapto-functional compound; an unsaturated compound; an epoxy-functional silane; an epoxy-functional siloxane; a combination, such as a reaction product, of an epoxy-functional silane or epoxy-functional siloxane and a hydroxy-functional polyorganosiloxane; or a combination thereof. Suitable adhesion promoters are known in the art and are commercially available. For example, Silquest® A186 is beta-(3,4-epoxycyclohexyl)ethyltrimethoxysilane which is commercially available from Crompton OSi Specialties of Middlebury, Conn., USA. CD9050 is a monofunctional acid ester useful as an adhesion promoter that provides adhesion to metal substrates and is designed for radiation curable compositions. CD9050 is commercially available from Sartomer Co. SR489D is tridecyl acrylate, SR395 is isodecyl acrylate, SR257 is stearyl acrylate, SR506 is isobornyl acrylate, SR833S is tricyclodecane dimethanol diacrylate, SR238 is 1,6 hexanediol diacrylate, and SR351 is trimethylol propane triacrylate, all of which are also commercially available from Sartomer Co. The amount of adhesion promoter added to the composition depends on various factors including the specific adhesion promoter selected, the other components of the composition, and the end use of the composition, however, the amount may range from 0.1% to 5% based on the weight of the composition. Other suitable adhesion promoters, which are useful to promote adhesion to metals, include maleic anhydride, methacrylic anhydride, and glycidyl methacrylate.

Component (VII) can be an unsaturated or epoxy-functional compound. Suitable epoxy-functional compounds are known in the art and commercially available, see for example, U.S. Pat. Nos. 4,087,585; 5,194,649; 5,248,715; and 5,744,507 (at col. 4-5). Component (g) may comprise an unsaturated or epoxy-functional alkoxysilane. For example, the functional alkoxysilane can have the formula $R^{20}_v Si(OR^{21})_{(4-v)}$, where subscript v is 1, 2, or 3, alternatively v is 1.

Each $R^{20}$ is independently a monovalent organic group with the proviso that at least one $R^{20}$ is an unsaturated organic group or an epoxy-functional organic group. Epoxy-functional organic groups for $R^{20}$ are exemplified by 3-glycidoxypropyl and (epoxycyclohexyl)ethyl. Unsaturated organic groups for $R^{20}$ are exemplified by 3-methacryloyloxypropyl, 3-acryloyloxypropyl, and unsaturated monovalent hydrocarbon groups such as vinyl, allyl, hexenyl, undecylenyl.

Each $R^{21}$ is independently an unsubstituted, saturated hydrocarbon group of 1 to 4 carbon atoms, alternatively 1 to 2 carbon atoms. $R^{21}$ is exemplified by methyl, ethyl, propyl, and butyl.

Examples of suitable epoxy-functional alkoxysilanes include 3-glycidoxypropyltrimethoxysilane, 3-glycidoxypropyltriethoxysilane, (epoxycyclohexyl)ethyldimethoxysilane, (epoxycyclohexyl)ethyldiethoxysilane and combinations thereof. Examples of suitable unsaturated alkoxysilanes include vinyltrimethoxysilane, allyltrimethoxysilane, allyltriethoxysilane, hexenyltrimethoxysilane, undecylenyltrimethoxysilane, 3-methacryloyloxypropyl trimethoxysilane, 3-methacryloyloxypropyl triethoxysilane, 3-acryloyloxypropyl trimethoxysilane, 3-acryloyloxypropyl triethoxysilane, and combinations thereof. Alternatively, examples of suitable adhesion promoters include glycidoxypropyltrimethoxysilane and a combination of glycidoxypropyltrimethoxysilane with an aluminum chelate or zirconium chelate.

Component (VII) may comprise an epoxy-functional siloxane such as a reaction product of a hydroxy-terminated polyorganosiloxane with an epoxy-functional alkoxysilane, as described above, or a physical blend of the hydroxy-terminated polyorganosiloxane with the epoxy-functional alkoxysilane. Component (VII) may comprise a combination of an epoxy-functional alkoxysilane and an epoxy-functional siloxane. For example, component (VII) is exemplified by a mixture of 3-glycidoxypropyltrimethoxysilane and a reaction product of hydroxy-terminated methylvinylsiloxane with 3-glycidoxypropyltrimethoxysilane, or a mixture of 3-glycidoxypropyltrimethoxysilane and a hydroxy-terminated methylvinylsiloxane, or a mixture of 3-glycidoxypropyltrimethoxysilane and a hydroxy-terminated methylvinyl/dimethylsiloxane copolymer. When used as a physical blend rather than as a reaction product, these components may be stored separately in multiple-part kits.

Suitable mercapto-functional compounds include an organomercaptan, a mercapto containing silane, or a combination thereof. Suitable mercapto containing silanes include 3-mercaptopropyltrimethoxysilane. Suitable mercapto-functional compounds are disclosed in U.S. Pat. No. 4,962,076. One skilled in the art would recognize that certain components described herein may be added to the composition for more than one or different purposes. For example, alkoxysilanes may be use as adhesion promoters, filler treating agents, and/or as crosslinking agents in condensation reaction curable silicone compositions.

Component (VIII) is a colorant (e.g., dye or pigment). Examples of suitable colorants include carbon black, Stan-Tone 40SP03 Blue (which is commercially available from PolyOne) and Colorant BA 33 Iron Oxide pigment (which is commercially available from Cathay Pigments (USA), Inc. Valparaiso, Ind. 46383 USA). Examples of colorants are known in the art and are disclosed in U.S. Pat. Nos. 4,962,076; 5,051,455; and 5,053,442. The amount of colorant added to the curable silicone composition depends on various factors including the other components of the composition, and the type of colorant selected, however, the amount may range from 0.001% to 20% based on the weight of the composition.

Component (IX) is a reactive diluent. Component (IX) may be diluent that reacts with a functional group on component (I) or (II). The reactive diluent may be a monofunctional reactive diluent, a difunctional reactive diluent, a polyfunctional reactive diluent, or a combination thereof. The reactive diluent selected will depend on various factors including the curable groups on components (I) and (II). However, examples of suitable reactive diluents include an acrylate, an anhydride such as a maleic anhydride or methacrylic anhydride, an epoxy such as a monofunctional epoxy compound, a methacrylate such as glycidyl methacrylate, an oxetane, a vinyl acetate, a vinyl ester, a vinyl ether, a fluoro alkyl vinyl ether, a vinyl pyrrolidone such as N-vinyl pyrrolidone, a styrene, or a combination thereof.

Mono-functional acrylate and methacrylate esters are commercially available from companies such as Sartomer, Rohm Haas, Hitachi Chemical, Arkema, Inc., Cytec, Sans Ester Corp, Rahn, and Bomar Specialties Co. Specific examples include methyl acrylate; methyl methacrylate; ethyl acrylate; ethyl methacrylate; butyl acrylate; butyl methacrylate; cyclohexyl acrylate; hexyl acrylate; 2-ethylhexyl acrylate; isodecyl methacrylate; isobornyl methacrylate; hydroxyethyl methacrylate; hydroxypropyl acrylate; hydroxypropyl methacrylate; n-octyl acrylate; cyclohexyl methacrylate; hexyl methacrylate; 2-ethylhexyl methacrylate; decyl methacrylate; dodecyl methacrylate; lauryl acrylate; tert-butyl methacrylate; acrylamide; N-methyl acrylamide; diacetone acrylamide; N-tert-butyl acrylamide; N-tert-octyl acrylamide; N-butoxyacrylamide; gamma-methacryloxypropyl trimethoxysilane; dicyclopentadienyloxyethyl methacrylate; 2-cyanoethyl acrylate; 3-cyanopropyl acrylate; tetrahydrofurfuryl methacrylate; tetrahydrofurfuryl acrylate; glycidyl acrylate; acrylic acid; methacrylic acid; itaconic acid; glycidyl methacrylate; 1,12 dodecanediol dimethacrylate; 1,3-butylene glycol diacrylate; 1,3-butylene glycol dimethacrylate; 1,3-butylene glycol dimethacrylate; 1,4-butanediol diacrylate; 1,4-butanediol dimethacrylate; 1,4-butanediol dimethacrylate; 1,6 hexanediol diacrylate; 1,6 hexanediol dimethacrylate; alkoxylated cyclohexane dimethanol diacrylate; alkoxylated hexanediol diacrylate; alkoxylated neopentyl glycol diacrylate; cyclohexane dimethanol diacrylate; cyclohexane dimethanol dimethacrylate; diethylene glycol diacrylate; diethylene glycol dimethacrylate; dipropylene glycol diacrylate; ethoxylated bisphenol a diacrylate; ethoxylated bisphenol a dimethacrylate; ethylene glycol dimethacrylate; neopentyl glycol diacrylate; neopentyl glycol dimethacrylate; polypropylene glycoldimethacrylate; propoxylated neopentyl glycol diacrylate; propoxylated neopentyl glycol diacrylate; tricyclodecane dimethanol diacrylate; triethylene glycol diacrylate; trimethylolpropane triacrylate; trimethylolpropane trimethacrylate; tris(2-hydroxy ethyl) isocyanurate triacrylate; tris (2-hydroxy ethyl) isocyanurate triacrylate; n,n'-m-phenylenedimaleimide; triallyl cyanurate; triallyl isocyanurate; metallic diacrylate; metallic dimethacrylate; metallic monomethacrylate; metallic diacrylate (difunctional); metallic dimethacrylate (difunctional); triethoxysilylpropyl methacrylate; tributoxysilylpropyl methacrylate; dimethoxymethylsilylpropyl methacrylate; diethoxymethylsilylpropyl methacrylate; dibutoxymethylsilylpropyl methacrylate; diisopropoxymethylsilylpropyl methacrylate; dimethoxysilylpropyl methacrylate; diethoxysilylpropyl methacrylate; dibutoxysilylpropyl methacrylate; diisopropoxysilylpropyl methacrylate; trimethoxysilylpropyl acrylate; triethoxysilylpropyl acrylate; tributoxysilylpropyl acrylate; dimethoxymethylsilylpropyl acrylate; diethoxymethylsilylpropyl acrylate; dibutoxymethylsilylpropyl acrylate; diisopropoxymethylsilylpropyl acrylate; dimethoxysilylpropyl acrylate; diethoxysilylpropyl acrylate; dibutoxysilylpropyl acrylate; and diisopropoxysilylpropyl acrylate.

Examples of suitable vinyl ethers include, but are not limited to butanediol divinyl ether, cyclohexanedimethanol divinyl ether, cyclohexanedimethanol monovinyl ether, cyclohexyl vinyl ether, diethyleneglycol divinyl ether, diethyleneglycol monovinyl ether, dodecyl vinyl ether, ethyl vinyl ether, hydroxybutyl vinyl ether, isobutyl vinyl ether, isopropyl vinyl ether, n-butyl vinyl ether, n-propyl vinyl ether, octadecyl vinyl ether, triethyleneglycol divinyl ether, and combinations thereof. Vinyl ethers are known in the art and commercially available from BASF AG of Germany, Europe. The amount of component (IX) depends on various factors such as the specific reactive diluent selected, but the amount may range from 0.5 to 50% based on the weight of curable silicone composition. One skilled in the art would recognize that some of the reactive diluents described herein (such as the difunctional and polyfunctional acrylates and methacrylates) may also be used in addition to, or instead of, the reactive species described above as component c) of (I).

Component (X) is a corrosion inhibitor. Examples of suitable corrosion inhibitors include benzotriazole, mercaptabenzotriazole, mercaptobenzothiazole, and commercially available corrosion inhibitors such as 2,5-dimercapto-1,3,4-thiadiazole derivative (CUVAN® 826) and alkylthiadiazole (CUVAN® 484) from R. T. Vanderbilt. The amount of component (X) may range from 0.05% to 0.5% based on the weight of the curable silicone composition.

Component (XI) is a polymerization inhibitor. Examples of suitable polymerization inhibitors for acrylate and methacrylate curable groups include, but are not limited to: 2,6,-Di-tert-butyl-4-(dimethylaminomethyl)phenol (DBAP), hydroquinone (HQ); 4-methoxyphenol (MEHQ); 4-ethoxyphenol; 4-propoxyphenol; 4-butoxyphenol; 4-heptoxyphenol; butylated hydroxytoluene (BHT); hydroquinone monobenzylether; 1,2-dihydroxybenzene; 2-methoxyphenol; 2,5-dichlorohydroquinone; 2,5-di-tert-butylhydroquinone; 2-acetylhydroquinone; hydroquinone monobenzoate; 1,4-dimercaptobenzene; 1,2-dimercaptobenzene; 2,3,5-trimethylhydroquinone; 4-aminophenol; 2-aminophenol; 2-N, N-dimethylaminophenol; 2-mercaptophenol; 4-mercaptophenol; catechol monobutylether; 4-ethylaminophenol; 2,3-dihydroxyacetophenone; pyrogallol-1, 2-dimethylether; 2-methylthiophenol; t-butyl catechol; di-tert-butylnitroxide; di-tert-amylnitroxide; 2,2,6,6-tetramethyl-piperidinyloxy; 4-hydroxy-2,2,6,6-tetramethyl-piperidinyloxy; 4-oxo-2,2,6,6-tetramethyl-piperidinyloxy; 4-dimethylamino-2,2,6,6-tetramethyl-piperidinyloxy; 4-amino-2,2,6,6-tetramethyl-piperidinyloxy; 4-ethanoloxy-2,2,6,6-tetramethyl-piperidinyloxy; 2,2,5,5-tetramethyl-pyrrolidinyloxy; 3-amino-2,2,5,5-tetramethyl-pyrrolidinyloxy; 2,2,5,5-tetramethyl-1-oxa-3-azacyclopentyl-3-oxy; 2,2,5,5-tetramethyl-3-pyrrolinyl-1-oxy-3-carboxylic acid; 2,2,3,3,5,5,6,6-octamethyl-1,4-diazacyclohexyl-1,4-dioxy; salts of 4-nitrosophenolate; 2-nitrosophenol; 4-nitrosophenol; copper dimethyldithiocarbamate; copper diethyldithiocarbamate; copper dibutyldithiocarbamate; copper salicylate; methylene blue; iron; phenothiazine (PTZ); 3-oxophenothiazine; 5-oxophenothiazine; phenothiazine dimer; 1,4-benzenediamine; N-(1,4-dimethylpentyl)-N'-phenyl-1,4-benzenediamine; N-(1,3-dimethylbutyl)-N'-phenyl-1,4-benzenediamine; N-nitrosophenylhydroxylamine and salts thereof; nitric oxide; nitrobenzene; p-benzoquinone; pentaerythrityl tetrakis(3-laurylthiopropionate); dilauryl thiodipropionate; distearyll thiodipropionate; ditridecyl thiodipropionate; tetrakis[methylene 3-(3, 5-di-tert-butyl-4-hydroxyphenyl)propionate]methane; thiodiethylene bis[3-(3,5-di-tert-butyl-4-hydroxyphenyl) propionate]; octadecyl-3-(3,5-di-tert-butyl-4-hydroxyphenyl) propionate; isotridecyl-3-(3,5-di-tert-butyl-4-hydroxyphenyl) propionate; N,N'-hexamethyl(3,5-di-tertbutyl-4-hydroxyhydrocinnamamide); iso-octyl-3-(3,5-di-tert-butyl-4-hydroxyphenyl) propionate; 2,2'-ethylidenebis-(4,6-di-tert-butylphenol); 1,3,5-trimethyl-2,4,6-tris(3,5-di-tert-butyl-4-hydroxybenzyl)benzene; 4,6-bis(octylthiomethyl)-o-cresol; triethylene glycol-bis-3-(3-tert-butyl-4-hydroxy-5-methylphenyl)propionate; tris-(3,5-di-tert-butylhydroxybenzyl) isocyanurate; tris(2,4-di-tert-butylphenyl)phosphate; distearyl pentaerythritol diphosphite; bis(2,4-di-tert-butyl phenyl)pentaerythritol diphosphite; 2,5-di-tert-amyl-hydroquinone; or isomers thereof; combinations of two or more thereof; or combinations of one or more of the above with molecular oxygen. When present, the polymerization inhibitor may be added to the curable silicone composition in an amount ranging from 100 ppm to 4,000 ppm. Polymerization inhibitors are known in the art and are disclosed, for example in EP 1 359 137.

Component (XII) is a filler that may be added if a filler was not used in the process for making the clustered functional polyorganosiloxane, or if additional filler or a different type of filler is desired, such as a thermally conductive filler. The filler may be a filler described above as component e). Alternatively, the filler may be a thermally conductive filler.

The thermally conductive filler may be both thermally conductive and electrically conductive. Alternatively, the thermally conductive filler may be thermally conductive and electrically insulating. The thermally conductive filler may be selected from the group consisting of aluminum nitride, aluminum oxide, aluminum trihydrate, barium titanate, beryllium oxide, boron nitride, carbon fibers, diamond, graphite, magnesium hydroxide, magnesium oxide, metal particulate, onyx, silicon carbide, tungsten carbide, zinc oxide, and a combination thereof. The thermally conductive filler may comprise a metallic filler, an inorganic filler, a meltable filler, or a combination thereof. Metallic fillers include particles of metals and particles of metals having layers on the surfaces of the particles. These layers may be, for example, metal nitride layers or metal oxide layers on the surfaces of the particles. Suitable metallic fillers are exemplified by particles of metals selected from the group consisting of aluminum, copper, gold, nickel, silver, and combinations thereof, and alternatively aluminum. Suitable metallic fillers are further exemplified by particles of the metals listed above having layers on their surfaces selected from the group consisting of aluminum nitride, aluminum oxide, copper oxide, nickel oxide, silver oxide, and combinations thereof. For example, the metallic filler may comprise aluminum particles having aluminum oxide layers on their surfaces.

Inorganic fillers are exemplified by onyx; aluminum trihydrate, metal oxides such as aluminum oxide, beryllium oxide, magnesium oxide, and zinc oxide; nitrides such as aluminum nitride and boron nitride; carbides such as silicon carbide and tungsten carbide; and combinations thereof. Alternatively, inorganic fillers are exemplified by aluminum oxide, zinc oxide, and combinations thereof. Meltable fillers may comprise Bi, Ga, In, Sn, or an alloy thereof. The meltable filler may optionally further comprise Ag, Au, Cd, Cu, Pb, Sb, Zn, or a combination thereof. Examples of suitable meltable fillers include Ga, In—Bi—Sn alloys, Sn—In—Zn alloys, Sn—In—Ag alloys, Sn—Ag—Bi alloys, Sn—Bi—Cu—Ag alloys, Sn—Ag—Cu—Sb alloys, Sn—Ag—Cu alloys, Sn—Ag alloys, Sn—Ag—Cu—Zn alloys, and combinations thereof. The meltable filler may have a melting point ranging from 50° C. to 250° C., alternatively 150° C. to 225° C. The meltable filler may be a eutectic alloy, a non-eutectic alloy, or a pure metal. Meltable fillers are commercially available.

For example, meltable fillers may be obtained from Indium Corporation of America, Utica, N.Y., U.S.A.; Arconium, Providence, R.I., U.S.A.; and AIM Solder, Cranston, R.I., U.S.A. Aluminum fillers are commercially available, for example, from Toyal America, Inc. of Naperville, Ill., U.S.A. and Valimet Inc., of Stockton, Calif., U.S.A. Silver filler is commercially available from Metalor Technologies U.S.A. Corp. of Attleboro, Mass., U.S.A.

Thermally conductive fillers are known in the art and commercially available, see for example, U.S. Pat. No. 6,169,142 (col. 4, lines 7-33). For example, CB-A20S and Al-43-Me are aluminum oxide fillers of differing particle sizes commercially available from Showa-Denko, and AA-04, AA-2, and AA18 are aluminum oxide fillers commercially available from Sumitomo Chemical Company Zinc oxides, such as zinc oxides having trademarks KADOX® and XX®, are commercially available from Zinc Corporation of America of Monaca, Pa., U.S.A.

The shape of the thermally conductive filler particles is not specifically restricted, however, rounded or spherical particles may prevent viscosity increase to an undesirable level upon high loading of the thermally conductive filler in the composition.

The thermally conductive filler may be a single thermally conductive filler or a combination of two or more thermally conductive fillers that differ in at least one property such as particle shape, average particle size, particle size distribution, and type of filler. For example, it may be desirable to use a combination of inorganic fillers, such as a first aluminum oxide having a larger average particle size and a second aluminum oxide having a smaller average particle size. Alternatively, it may be desirable, for example, use a combination of an aluminum oxide having a larger average particle size with a zinc oxide having a smaller average particle size. Alternatively, it may be desirable to use combinations of metallic fillers, such as a first aluminum having a larger average particle size and a second aluminum having a smaller average particle size. Alternatively, it may be desirable to use combinations of metallic and inorganic fillers, such as a combination of aluminum and aluminum oxide fillers; a combination of aluminum and zinc oxide fillers; or a combination of aluminum, aluminum oxide, and zinc oxide fillers. Use of a first filler having a larger average particle size and a second filler having a smaller average particle size than the first filler may improve packing efficiency, may reduce viscosity, and may enhance heat transfer.

The average particle size of the thermally conductive filler will depend on various factors including the type of thermally conductive filler selected and the exact amount added to the curable silicone composition, as well as the bondline thickness of the device in which the cured product of the composition will be used when the cured product will be used as a thermal interface material (TIM). However, the thermally conductive filler may have an average particle size ranging from 0.1 micrometer to 80 micrometers, alternatively 0.1 micrometer to 50 micrometers, and alternatively 0.1 micrometer to 10 micrometers.

The amount of the thermally conductive filler in the composition depends on various factors including the cure mechanism selected for the curable silicone composition and the specific thermally conductive filler selected. However, the amount of the thermally conductive filler may range from 30 vol % to 80 vol %, alternatively 50 vol % to 75 vol % by volume of the composition. Without wishing to be bound by theory, it is thought that when the amount of filler is greater than 80 vol %, the composition may crosslink to form a cured silicone with insufficient dimensional integrity for some applications, and when the amount of filler is less than 30%, the cured silicone prepared from the composition may have insufficient thermal conductivity for TIM applications.

Component (XIII) is a filler treating agent. The filler treating agent may be a filler treating agent described above as the filler treating agent for component e). Alternatively, metal fillers can be treated with alkylthiols such as octadecyl mercaptan and others, and fatty acids such as oleic acid, stearic acid, titanates, titanate coupling agents, zirconate coupling agents, and a combination thereof.

Filler treating agents for alumina or passivated aluminum nitride may include alkoxysilyl functional alkylmethyl polysiloxanes (e.g., partial hydrolysis condensate of $R^{22}{}_{w}R^{23}{}_{x}Si(OR)_{(4w-x)}$ or cohydrolysis condensates or mixtures), or similar materials where the hydrolyzable group may comprise silazane, acyloxy or oximo. In all of these, a group tethered to Si, such as $R^{22}$ in the formula above, is a long chain unsaturated monovalent hydrocarbon or monovalent aromatic-functional hydrocarbon. Each $R^{23}$ is independently a monovalent hydrocarbon group, and each $R^{24}$ is independently a monovalent hydrocarbon group of 1 to 4 carbon atoms. In the formula above, subscript w is 1, 2, or 3 and subscript x is 0, 1, or 2, with the proviso that the sum (w+x) is 1, 2, or 3. One skilled in the art would recognize that the alkoxysilanes and mercapto-functional compounds described as adhesion promoters for component (VII) may alternatively be used, in addition to or instead of, filler treating agents for component (XIII). One skilled in the art could optimize a specific treatment to aid dispersion of the filler without undue experimentation.

Component (XIV) is an acid acceptor. The acid acceptor may comprise a metal oxide such as magnesium oxide. Acid acceptors are known in the art and are commercially available under tradenames including Rhenofit F, Star Mag CX-50, Star Mag CX-150, BLP-3, and MaxOx98LR. Rhenofit F was calcium oxide from Rhein Chemie Corporation of Chardon, Ohio, USA. Star Mag CX-50 was magnesium oxide from Merrand International Corp. of Portsmouth, N.H., USA. MagOX 98LR was magnesium oxide from Premier Chemicals LLC of W. Conshohocken, Pa., USA. BLP-3 was calcium carbonate was Omya Americas of Cincinnati, Ohio, USA.

The curable silicone composition of the present invention is generally formed by a dry blend process, in which the clustered functional polyorganosiloxane (I), the reactive resin and polymer (II), the radical initiator (III), the moisture cure initiator (IV); and the crosslinker (IV), as well as any combination of the optional components (VI)-(XIV), are mixed in a container prior to application. In certain embodiments, the dry blend process occurs in an inert atmosphere (using 2% oxygen in nitrogen atmosphere) to enable the polymerization inhibitor (XI) and to prevent premature radical formation.

The curable silicone composition described above may be used in various applications including, for example, sealant applications such as forming a lid seal (e.g., automotive lid seal or microelectronics lid seal), forming an adhesive (such as a die attach adhesive or thermally conductive adhesives), or forming a terminal sealant. One skilled in the art would be able to select appropriate curing agents and additional components to formulate compositions for sealants and adhesives based on the description above and the examples provided herein.

The curable silicone composition described above, and a cured silicone coating prepared by curing the composition on a substrate, are useful in electronics applications, including both microelectronics and macroelectronics applications as well as optoelectronics applications and thermally conductive electronics applications, such as making thermally conductive adhesives. Cured silicone adhesives prepared from such a curable silicone composition may adhere to various substrates such as electronics substrates, including metal substrates such as gold, silver, aluminum, copper, and electroless nickel; as well as polymeric substrates such as FR4, Nylon, polycarbonate, Lucite (which is polymethylmethacrylate, PMMA), polybutylene terephthalate (PBT), and liquid crystal polymers such as Xydar®, available from Solvay Chemicals, Houston, Tex. 77098 USA.

The curable silicone compositions described above may be dispensed or otherwise applied to an appropriate substrate at a desired thickness and cured by thermal radical cure and moisture cure. The curing step includes the step of heating the applied composition to promote the radical curing of the radical group containing components of the curable silicone composition. In addition, any moisture or condensation present will promote the moisture curing of the moisture cure group containing components. More specific examples of the curing are provided in the Examples below.

EXAMPLES

These examples are intended to illustrate the invention to one of ordinary skill in the art and should not be interpreted as limiting the scope of the invention set forth in the claims. The following components were used in the examples described below.

NMR: Solution-state $^{29}$Si- and $^{13}$C-NMR spectra were recorded on a Mercury VX 400 MHz spectrometer at room temperature (20-22° C.) using CDCl3 (Isotec) in a 16 mm Si-free probe. Cr(acac)$_3$ (20 mM) was added to NMR samples as a relaxation agent. $^{29}$Si NMR spectra were acquired at 79.493 MHz and processed with 5 Hz of Lorentzian line broadening. The spectra were only semi-quantitative due to the long relaxation times of the $^{29}$Si nucleus, but relative comparison of spectra acquired under identical conditions was considered quantitative. $^{13}$C NMR spectra were acquired at 100.626 MHz and processed with 3 Hz of Lorentzian line broadening. For both nuclei, 256-512 scans with a 90° pulse width were typically co-added to achieve adequate sensitivity; a 6-second ($^{29}$Si) or 12-second (13C) delay between pulses was used. Gated decoupling was used to remove negative nuclear Overhauser effects. Chemical shifts were referenced to external tetramethylsilane (TMS).

I. Impact of Isomer Reducing Agent on Clustered Functional Polyorganosiloxane

A. Variation in Amount of Added Isomer Reducing Agent on Generation of T(Oz) and D(Oz) Units In a dry 3-neck flask, 100 g DOW CORNING® SFD-119 (dimethylvinyl-terminated dimethyl siloxane), 6.2 g cyclic methylhydrogensiloxane, 14 g allyl methacrylate (AMA), 0.2 g butylated hydroxytoluene (BHT) and varying amounts of an isomer reducing agent (either OFS-1579, available from Dow Corning Corporation of Midland, Mich., or DBAP (2,6-Di-tert-butyl-4-(dimethylaminomethyl)phenol) were added and mixed under a nitrogen blanket. 0.12 g of a platinum catalyst (DOW CORNING® 2-0707) was added and the mixture was mixed for an additional 5 minutes. The mixture was then heated to 60° C. for 1 hour. The reaction was monitored by the reduction in the SiH peak at 2173 cm$^{-1}$ by IR spectroscopy. The mixture was cooled to room temperature and diallyl maleate (DAM) was added. The reaction mixture was analyzed by $^{29}$Si NMR for the presence of T(Oz) and D(Oz) units. The results are summarized in Tables 1 and 2 below and indicate that the introduction of at least 100 ppm of an isomer reducing agent in the formulation (either OFS-1579 or DBAP) reduced the level of T(Oz) and D(Oz) units by at least 10%, which corresponds to at least a 10% reduction in the beta-addition of SiH groups of the methylhydrogensiloxane to the allyl methacrylate.

TABLE 1

| OFS-1579 (ppm) | 0 | 100 | 200 | 500 | 1000 |
|---|---|---|---|---|---|
| T(Oz) | 0.46 | 0.39 | 0.43 | 0.29 | 0.27 |
| D(Oz) | 1.81 | 1.42 | 1.38 | 1.49 | 1.36 |
| % Decrease in Isomer | 0 | 20.3 | 20.3 | 21.6 | 28.2 |

TABLE 2

| DBAP (ppm) | 0 | 100 | 200 | 500 | 1000 |
|---|---|---|---|---|---|
| T(Oz) | 0.46 | 0.34 | 0.37 | 0.16 | 0.27 |
| D(Oz) | 1.81 | 1.68 | 1.65 | 1.59 | 1.6 |
| % Decrease in Isomer | 0 | 11.0 | 11.0 | 22.9 | 17.6 |

B. Viscosity Comparison of Samples with and without Isomer Reducing Agent (Samples 1 and 2)

In a 10 liter Turello mixer, 5000 g of DOW CORNING® SFD117, 196.34 g of cyclic methylhydrogensiloxane, 467.76 g of AMA and 1.13 g of BHT were added and mixed for 15 minutes. 5.45 g of platinum catalyst was added and the mixture was mixed for a further 15 minutes at room temperature. The mixture was heated to 80° C. for 1 hour, wherein samples were evaluated by IR for the disappearance of SIH signal. At 1 hour the mixture was cool to less than 45° C. wherein 11.33 g of DAM was added. The vacuum was set to 55 mmHg and the temperature was increased to 80° C. and the mixture was stripped for 30 minutes. The resultant composition (Sample 1) was cooled to less than 30° before packaging.

In a 10 liter Turello mixer, 5000 g of DOW CORNING® SFD117, 196.34 g of cyclic methylhydrogensiloxane, 467.76 g of AMA, 1.13 g of BHT and 1.13 g of OFS-1579 were added and mixed for 15 minutes. 5.45 g of platinum catalyst was added and the mixture was mixed for a further 15 minutes at room temperature. The mixture was heated to 80° C. for 1 hour, wherein samples were evaluated by IR for the disappearance of SIH signal. At 1 hour the mixture was cool to less than 45° C. wherein 11.33 g of DAM was added. The vacuum was set to 55 mmHg and the temperature was increased to 80° C. and the mixture was stripped for 30 minutes. The resultant composition (Sample 2) was cooled to less than 30° before packaging.

Samples 1 and 2 were measured for viscosity (in centipoises (cps) using a Brookfield LVF viscometer at 3 revolutions per minute using a #3 spindle. The results, as shown in Table 3, that the introduction of the isomer reducing agent (Sample 2) provided a relatively stable viscosity over a 194 day period, while the viscosity of the corresponding example (Sample 1) without the isomer reducing agent increased to almost double the viscosity after 127 days and to the point of gellation after 194 days.

TABLE 3

| Days of aging | Initial | 127 | 194 |
|---|---|---|---|
| Sample 2 | 9200 | 9600 | 9600 |
| Sample 1 | 6800 | 11600 | Gelled |

II. Evaluation of Physical Properties of Adhesive Composition

A. Preparation of Methacrylate Clustered Silicone Polymers with (MCP-1) and without (MCP) Isomer Reducing Agent.

In a 50 liter Turello mixer 12 kg of a silicone polymer masterbatch (MB2030) (SFD-128/silica blend), 6.77 kg of SFD120 polymer, 1.12 kg of OS20 silicone fluid (methylsiloxane fluid available from Dow Corning Corporation of Midland, Mich.) and 20.45 g of OFS-1579 isomer reducing agent were loaded. The mixture was inserted using 2% oxygen in nitrogen atmosphere and stirred for 15 minutes. To this homogenized mixture was added 6 g of BHT, 409.7 g of cyclic methylhydrogensiloxane, and 965.3 g of AMA. The resultant mixture was stirred for an additional 20 minutes at room temperature, at which point 26.62 g of a platinum catalyst was added and the mixture. The mixture was stirred for 10 additional minutes before setting the temperature at 60° C. The temperature was held for 30 minutes at 60° C. before cooling to greater than 40° C. and adding 26.62 g of DAM. The mixture was then cooled to less than 35° C. before adding 182.8 g of methyltrimethoxysilane (MTM). The mixture was then heated to 60° C. and held for 30 minutes, wherein the temperature was increased to 80° C. and a vacuum of 55 mm Hg was applied for 40 minutes. The resultant polymer is hereinafter referred to as MCP-1.

For producing the MCP resin without an isomer reducing agent, the same procedure was followed as in the previous paragraph with the exception of the addition of 20.45 g of OFS-1579 isomer reducing agent.

B. Synthesis Alkoxylated Resin Polymer Blend (ARPB-1)

To a 10 kg Turello mixer a resin polymer blend (RPB) was added along with magnesium oxide, and iron pigment BA33 and blended for 15 minutes under a nitrogen blanket. To this mixer a mixture of methyltrimethoxysilane (DOW CORNING® Z-6070) and hexamethyldisilazane (DOW CORNING® 4-2839) was added. The mixture was blended for 15 minutes prior to steam heating the material to 60-80° C. The temperature was held at 60° C. for 30 minutes. The temperature was increased to 120° C. and a fully vacuum of less than 50 torr was applied for 60 minutes. The mixture was cooled to less than 40° C. prior to the addition of an alkoxylating agent (ETM polymer—DOW CORNING® XCF3-6105) and endcapper (Bis H DOW CORNING® 2-5161). After 15 minutes of mixing a platinum catalyst was added with a further 15 minutes of mixing prior to heating the mixture to a temperature of 75-90° C. The SiH/CH$_3$ ratio was monitored by IR until completion of the reaction within 20 minutes. The material was devolatilized by heating to 125° C. with full vacuum of 55 mm Hg for 30 minutes.

C. Preparation of Adhesives and Adhesive Testing

Adhesive compositions were prepared by cold blending the methacrylate clustered silicone polymer with and without an isomer reducing agent (i.e., MCP-1 and MCP, respectively) with ARPB-1 and with addition promoter packages and radical initiators as provided in Table 4 below. The resultant adhesive compositions were then evaluated for viscosity at 1 day, 7 days and 14 days as shown in Table 5.

TABLE 4

| MCP or MCP-1 | 71.75 |
|---|---|
| ARBP-1 | 19.34 |
| RBM-9020 Modifier[1] | 2.95 |
| OFS-6030 Silane[2] | 1.97 |
| TAIC[3] | 0.49 |
| TYZOR TNBT[4] | 0.62 |
| A-1110[5] | 0.1 |
| A186[6] | 0.6 |
| 2-Mercaptobenzothiazole[7] | 0.15 |
| OFS-2306 Silane[8] | 1.96 |
| OFS-1719 Silane[9] | 0.1 |
| TINOPAL OB[10] | 0.02 |

[1]T-catalyst available from Dow Corning Corporation of Midland, Michigan.
[2]Methacryloxypropyltrimethoxysilane available from Dow Corning Corporation of Midland, Michigan.
[3]Triallylisocyanurate available from Nippon Kasei Chemical Company Limited
[4]Epoxy functional silane available from Silquest.
[5]γ-Aminopropyltriethoxysilane available from Silquest.
[6]n-Butyl titanate available from DuPont ™.
[7]Available from Sigma-Aldrich
[8]Isobutyltrimethoxysilane available from Dow Corning Corporation of Midland, Michigan.
[9]Vinyldimethylchlorosilane available from Dow Corning Corporation of Midland, Michigan.
[10]2,5-thiophenediylbis(5-tert-butyl-1,3-benzoxazole), commercially available from Ciba.

TABLE 5

| | Viscosity (1 s$^{-1}$) Days Aged Room Temperature | | | |
|---|---|---|---|---|
| | 1 | 7 | 14 | % Change in Viscosity after 14 days |
| Table 3 Adhesive with MCP | 341.07 | 457.26 | 670.03 | 96.45 |
| Table 3 Adhesive with MCP-1 | 297.48 | 393.81 | 418.10 | 40.55 |

As Table 5 confirms, the introduction of the isomer reducing agent to the adhesive formulation resulted in a significant reduction in the viscosity increase of the adhesive after 14 days of aging.

Next, the adhesives were applied to Alclad™ aluminum substrates (available from Alcoa) and cured for 20 minutes at 85° C. and having 8 mil bond line thickness. One half of the samples were evaluated at room temperature and aged, while the remaining samples were placed in a pressure cooker tester (PCT) for 24 hours at 1 additional atmosphere and evaluated after aging. The lap shear adhesive properties of the coated substrates appropriately aged were evaluated for peak stress, in pounds per square inch (PSI), with the results summarized in Table 6.

TABLE 6

| | Peak Stress (PSI) | | | |
|---|---|---|---|---|
| | Dry Adhesion | | PCT | |
| | Initial | Week2 | Week1 | Week2 |
| Table 3 Adhesive with MCP | 431.16 | 400.51 | 513.01 | 527.18 |
| Table 3 Adhesive with MCP-1 | 495.94 | 424.66 | 563.12 | 533.39 |

As Table 6 confirms, the introduction of an isomer reducing agent to the adhesive composition resulted in comparable adhesion to Alclad™ aluminum substrates as compared with samples that did not include the isomer reducing agent.

D. Comparison of Physical Properties of Adhesive with MCP-1 Versus Commercially Available Adhesives on a Wide Variety of Substrates Next, Adhesive MCP-1 was compared with various commercially available adhesive compositions (DOW CORNING® 866, 3-6265, 3-6265 HP, and 7091), which are known to have excellent adhesion to a variety of both metal and plastic substrates. The incumbent one part silicone adhesive used in industrial processes generally use one of two cure processes. A heat activated Pt catalyzed addition chemistry that utilizes silicone hydride based crosslinkers with silicone vinyl polymers is utilized by DOW CORNING® 866, 3-6265, and 3-6265 HP. DOW CORNING® 7091 utilizes a condensation cure in which alkoxy silicone polymers equivalent to those utilized in ARPB which are triggered by exposure to moisture in the atmosphere.

The addition cured systems cure rapidly but take elevated temperature to develop adhesion (greater than 120° C. and typically 150° C.). These Pt based systems are known to be inhibited by numerous plastic substrates especially those containing basic substituent's like polyamides and epoxies. The elevated temperatures also lead to water physisorbed on the surface of plastics and metals to devolatilize. The devolatilization during the curing process can lead to bubbling and voiding issues. This is believed to be a combination of liquid water devolatilization and interaction of the water/SiH moieties in the presence of the platinum catalyst. The condensation curable adhesive develops adhesion at room temperature to a wider variety of substrate but adhesion typically takes days to weeks to fully develop.

Sample preparation on Alclad™ Panels:

1"×3" Al Alclad™ Panels were cleaned with acetone (3 samples prepared). Bondlines were established using Spheriglass spacer beads (Potters Industries Inc. 350 North Baker Drive, Canby, Oreg. 97013-0607) appropriate with the application (i.e., 8 mil (200 micron)). Larger bond lines used 20 mil wire.

A ⅜" binder clip was used with both spacers methods to secure substrates during cure. Cure at time and temperature were specified in results below. Testing was carried out on Instron 5566 tensiometer at 2 inches per minute (Instron Worldwide Headquarters, 825 University Ave., Norwood, Mass. 02062-2643). The results are summarized in Table 7 and 8 below:

TABLE 7

| Product # | DOW CORNING® 866 | DOW CORNING® 3-6265 | DOW CORNING® 3-6265HP | DOW CORNING® 7091 | Table 3 Adhesive with MCP-1 |
|---|---|---|---|---|---|
| Curing Mechanism | Pt Addition | Pt Addition | Pt Addition | Condensation | Radical/ Condensation |
| Durometer, Shore A | 57 | 60 | 67 | 37 | 36 |
| Tensile Strength, psi | 925 | 700 | 815 | 400 | 420 |
| Elongation, % | 210 | 165 | 145 | 590 | 285 |
| Modulus, 100%, psi | 440 | 425 | 560 | 70 | 135 |
| Lap shear to Alclad™ Al, psi | 725 | 610 | 800 | 430 | 400 |

TABLE 7-continued

| Product # | DOW CORNING® 866 | DOW CORNING® 3-6265 | DOW CORNING® 3-6265HP | DOW CORNING® 7091 | Table 3 Adhesive with MCP-1 |
|---|---|---|---|---|---|
| Viscosity low shear | 54,000 | 970,000 | 1,140,000 | | |
| Viscosity high shear | 49000 | 230,000 | 300,000 | | |
| Specific Gravity | 1.3 | 1.34 | 1.33 | 1.42 | 1.09 |
| Typical cure, time at bond line temp | 30 min @150° C., 60 min @125° C. | 20 min @150° C., 45 min @125° C. | 20 min @150° C., 45 min @125° C. | 3 days @25° C. | 20 min @85° C., 1-2 min @>100° C. |

As Table 7 confirms, the adhesive composition (Table 3 Adhesive with MCP-1) according to the present invention exhibited adequate physical properties in terms of Durometer hardness, tensile strength, elongation, modulus and lap shear on Alclad™ Al substrates. In addition, the adhesive composition (Table 3 Adhesive with MCP-1) according to the present invention cured at lower temperatures (actual cure condition or bond line cure condition) than platinum catalyzed addition chemistry adhesive systems and in substantially shorter time periods than condensation curable adhesive systems.

Sample Preparation on a Wide Variety of Metal and Plastic Substrates:

1"×3" panels of the various substrates were cleaned with acetone (3 samples prepared). Bondlines were established using Spheriglass spacer beads (Potters Industries Inc. 350 North Baker Drive, Canby, Oreg. 97013-0607) appropriate with the application (i.e., 8 mil (200 micron)). Larger bond lines used 20 mil wire.

A ⅜" binder clip was used with both spacers methods to secure substrates during cure. Cure at time and temperature were specified in results below. Testing was carried out on Instron 5566 tensiometer at 2 inches per minute (Instron Worldwide Headquarters, 825 University Ave., Norwood, Mass. 02062-2643).

TABLE 8

| | DOW CORNING® 866 | | DOW CORNING® 3-6265 | | DOW CORNING® 3-6265 HP | | Table 3 Adhesive with MCP-1 | |
|---|---|---|---|---|---|---|---|---|
| | PSI | % CF | PSI | % CF | PSI | % CF | PSI | % CF |
| Alclad™ Al[11] (Peel) | 12 | 10% | 20 | 100% | 20 | 20% | 40 | 100% |
| 3105 PBT[12] (lap shear) | 538 | 100 | 476 | 100 | 617 | 100 | 300 | 100% |
| 3105 PBT (peel) | 18 | 70 | 16 | 100 | 16 | 100 | 50 | 100% |
| LCP[13] (lap shear) | 107 | 0 | 0 | 0 | 100 | 0 | 290 | 100% |
| PA66[14] (peel) | 16 | 90 | 12 | 100 | 10 | 50 | 34 | 100% |
| PC[15] (peel) | 0 | 0 | 0 | 0 | 0 | 0 | 95 | 100% |
| PE[16] (peel) | 0 | 0 | 0 | 0 | 0 | 0 | 12 | 50% |
| FR-4[17] (lap shear) | 355 | 100 | 477 | 100 | 658 | 100 | 308 | 100% |
| FR-4 (peel) | 12 | 100 | 20 | 100 | 22 | 100 | 44 | 100% |

[11]Alclad Aluminum, Type AD Q-Panel 2024T3 from Q-Lab Corporation, 800., Cleveland, OH 44145 USA.

[12]3105 PBT: Polybutylene terephthalate Celanex® 3105 available from Ticona North America, Florence, KY 41042.

[13]LCP: liquid crystal polymer, Xydar® available from Solvay Chemicals, Houston, Texas 77098 USA.

[14]PA66: Polyamide Ultramid® available at BASF Corporation, Florham Park, NJ 07932 USA.

[15]PC: Polycarbonate Lexan® available from, SABIC Innovative Plastics Pittsfield, MA 01201, USA.

[16]PE: Polyethylene Medium High Density PE (PEX), available at Lowes, Mooresville, NC 28117 USA

[17]FR-4: Epoxy glass fiber laminates available from Norplex-Micarta, Postville, Iowa, USA.

As Table 8 illustrates, the adhesive composition (Table 3 Adhesive with MCP-1) according to the present invention exhibited adequate adhesion and cohesion to both aluminum and plastic substrates and was the only adhesive composition to adhere to polyethylene.

Table 9 below shows the impact on cure system of voiding caused by moisture on surface of certain plastic substrates, here Ticona Celanex® 3300D PBT and BASF polyamide PA66.

TABLE 9

| | Water Content | DOW CORNING® 3-6265 | DOW CORNING® 3-6265 HP | DOW CORNING® 7091 | Table 3 Adhesive with MCP-1 |
|---|---|---|---|---|---|
| Ticona Celanex® 3300D PBT | 0.20% | few bubbles | no bubbling | sig bubbling | no bubbling |
| | 0.33% | sig bubbling | few bubbles | sig bubbling | no bubbling |
| BASF polyamide PA66 | 1.50% | sig bubbling | some bubbles | sig bubbling | no bubbling |
| | 1.90% | sig bubbling | sig bubbling | sig bubbling | no bubbling |
| | 2.65% | sig bubbling | sig bubbling | sig bubbling | sig bubbling |

As Table 9 illustrates, the adhesive composition (Table 3 Adhesive with MCP-1) according to the present invention experienced no bubbling on either substrate at any of the provided water content levels.

E. Evaluation of Clustered Functional Polyorganosiloxane with Alternative Radical Initiators Using the process cited above but replacing RBM-9020 modifier a dichlorobenzoylperoxide based initiator with Perkadox L-50-PS and higher temperature benzoyl peroxide based initiator (See Table 6), higher temperature curing materials were evaluated over four different substrates (Polybutyl Terephthalate (PBT), Polyphenyl Sulphone (PPS), Alclad™ aluminum substrates (AL), and aluminum die cast metal (ADC)) under different curing conditions.

TABLE 10

| | |
|---|---|
| MCP-1 | 72.54 |
| ARBP-1 | 19.55 |
| Perkadox L-50S-PS[11] | 1.88 |
| OFS-6030 Silane[2] | 1.99 |
| TAIC[3] | 0.49 |
| TYZOR TNBT[4] | 0.62 |
| A-1110[5] | 0.1 |
| A186[6] | 0.6 |
| 2-Mercaptobenzothiazole[7] | 0.15 |
| OFS-2306 Silane[8] | 1.96 |
| OFS-1719 Silane[9] | 0.1 |
| TINOPAL OB[10] | 0.02 |

[11]Dibenzoyl peroxide available from Akzo-Nobel

TABLE 11A

| Cure method | Temp (deg C.) | Time (mins) | PBT N/cm² | PBT CF % | PPS N/cm² | PPS CF % |
|---|---|---|---|---|---|---|
| Press | 120 | 2 | 220 | 100 | 205 | 100 |
| | | 4 | 218 | 100 | 228 | 100 |
| | | 6 | 207 | 100 | 243 | 100 |
| Oven | 120 | 4 | 129 | 100 | 148 | 100 |
| | | 10 | 175 | 100 | 171 | 100 |
| | 100 | 20 | 173 | 100 | 201 | 100 |
| | | 30 | 180 | 100 | 185 | 100 |

% CF = percentage cohesive failure

TABLE 11B

| Cure method | Temp (deg C.) | Time (mins) | AL N/cm² | AL CF % | ADC N/cm² | ADC CF % |
|---|---|---|---|---|---|---|
| Press | 120 | 2 | 182 | 100 | 202 | 100 |
| | | 4 | 201 | 100 | 235 | 100 |
| | | 6 | 248 | 100 | 213 | 100 |

TABLE 11B-continued

| Cure method | Temp (deg C.) | Time (mins) | AL N/cm² | AL CF % | ADC N/cm² | ADC CF % |
|---|---|---|---|---|---|---|
| Oven | 120 | 4 | 242 | 100 | 205 | 100 |
| | | 10 | 260 | 100 | 225 | 100 |
| | 100 | 20 | 216 | 100 | 252 | 100 |
| | | 30 | 213 | 100 | 274 | 100 |

% CF = percentage cohesive failure

The results from Tables 11A and 11B confirm that adhesive compositions formed with the clustered functional polyorganosiloxane of the present invention including the isomer reducing agent but utilizing an alternative radical initiator exhibited good performance over a wide variety of metal and plastic substrates and under varying curing conditions.

F. Evaluation of Dispensing Properties for Thermal Radical Cure Silicone Adhesive Compositions Next, the dispensing properties for the thermal radical curable silicone compositions were evaluated.

The materials provided in Table 12 were cold blended in a Hauschild Speedmixer DAC 150.1 FV-K available from FlackTek Inc, Landrum, S.C. 29356 U.S.A.

TABLE 12

| | |
|---|---|
| RBM-9020 MODIFIER[1] | 32.22 |
| OFS-6030 Silane[2] | 21.99 |
| TAIC[3] | 5.47 |
| TYZOR TNBT[4] | 6.92 |
| A-1110[5] | 1.12 |
| A186[6] | 6.70 |
| 2-Mercaptobenzothiazole[7] | 1.67 |
| OFS-2306 Silane[8] | 21.88 |
| OFS-1719 Silane[9] | 1.12 |
| TINOPAL OB[10] | 0.22 |

The components in Table 13 were also mixed in the speedmixer prior to evaluation for dispensability.

TABLE 13

| Components | MCP | MCP+ | MCP + SFD-120 | MCP-112 + AP3[12] | MCP + ARPB-1 |
|---|---|---|---|---|---|
| MCP-1 | 72 | 92 | 72 | 72 | 72 |
| SFD-120 | — | — | 20 | — | — |
| AP3[12] | — | — | — | 20 | — |
| ARPB-1 | — | — | — | — | 20 |
| Table 12 mixture | 8 | 8 | 8 | 8 | 8 |
| TOTAL | 80 | 100 | 100 | 100 | 100 |
| Dispense Rating (5 = best) | 1 | 1 | 1 | 1 | 4 |

[12] AP3-DOW CORNING ® 3-1717 - Trimethoxysilylethyl)tetramethyldisiloxane-terminated polydimethylsiloxane (DOW CORNING ® SFD-117), about 2000 cps.

Dispense and stringing checks were done using an EFD 1000-XL syringe dispenser (Available from Nordson EFD, East Providence, R.I. 02914 U.S.A. Materials being compared were dispensed from 30 ml EFD syringes at 50 pounds per square inch of air pressure.

The rating is a subjective rating based on the ability to control the adhesive bead at an applied pressure. The rating is a reflection of the tendency and length of any bead on termination of applied pressure. Even with superior cure and adhesion to multiple substrates, the inability to routinely dispense a bead or dot of adhesive on a substrate, in a timely manner, can stop commercial adoption.

As Table 13 confirms, the ARPB-1 defined above improves dispensing without loss of mechanical properties. It also provides a secondary cure mechanism by which any surface tack in the radical cured system due to oxygen inhibition can be overcome. It should also be noted that the alkoxy functionality is highly desirable for adhesion to mineral and metallic surfaces.

The instant disclosure has been described in an illustrative manner, and it is to be understood that the terminology which has been used is intended to be in the nature of words of description rather than of limitation. Many modifications and variations of the instant disclosure are possible in light of the above teachings. It is, therefore, to be understood that within the scope of the appended claims, the instant disclosure may be practiced otherwise than as specifically described.

The invention claimed is:

1. A stable thermal radical curable silicone adhesive composition comprising:
(I) a clustered functional polyorganosiloxane having at least one radical curable group selected from an acrylate group and a methacrylate group;
(II) a reactive resin and polymer comprising:
  (a) an organopolysiloxane polymer of the formula $(R^7O)_{3-z}R^6_zSi-Q-(R^{25}_2SiO_{2/2})_y-Q-SiR^6_z(OR^7)_{3-z}$,
  wherein each $R^{25}$ is independently a monovalent hydrocarbon radical having 1 to 6 carbon atoms, each $R^6$ independently is a monovalent hydrocarbon radical having 1 to 6 carbon atoms, each $R^7$ independently is selected from the group consisting of an alkyl radical and alkoxyalkyl radical, Q is a divalent linking radical, the subscript z has a value of 0, 1 or 2, and the subscript y has a value of 60 to 1000; and
  (b) an alkoxy-functional organopolysiloxane resin comprising the reaction product of a reaction of:
    (i) an alkenyl-functional siloxane resin comprising $R^{26}_3SiO_{1/2}$ units and $SiO_{4/2}$ units,
    wherein each $R^{26}$ is independently a monovalent hydrocarbon radical having 1 to 6 carbon atoms with the proviso that at least one $R^{26}$ is an alkenyl radical,
    wherein the molar ratio of the $R^{26}_3SiO_{1/2}$ units to $SiO_{4/2}$ units has a value of from 0.5/1 to 1.5/1;
    (ii) an alkoxysilane-functional organosiloxane compound having at least one silicon-bonded hydrogen atom at a molecular terminal; and
    (iii) an endcapper of the formula $R^{17}_3SiO—(R^{17}_2SiO)_s—SiR^{17}_2H$ or $R^{18}_3SiO—(R^{18}_2SiO)_t—(HR^{18}SiO)—SiR^{18}_3$ or combinations thereof, wherein each $R^{17}$ and $R^{18}$ are independently a monovalent hydrocarbon group and wherein subscripts s and t independently have a value ranging from 0 to 10;
  in the presence of (iv) a hydrosilylation catalyst;
(III) a radical initiator;
(IV) a moisture cure initiator; and
(V) a crosslinker.

2. The adhesive composition according to claim 1, wherein the clustered functional polyorganosiloxane (I) comprises the reaction product of:
  a) a polyorganosiloxane having an average, per molecule, of at least 2 aliphatically unsaturated organic groups,
  b) a polyorganohydrogensiloxane having an average, per molecule, of 4 to 15 silicon atoms and at least 4 silicon bonded hydrogen atoms per aliphatically unsaturated organic group in component a), and
  c) a reactive species having, per molecule, at least one aliphatically unsaturated organic group and one or more curable groups selected from acrylate groups and methacrylate groups,
  in the presence of d) a hydrosilylation catalyst and e) an isomer reducing agent.

3. The adhesive composition according to claim 1, wherein the clustered functional polyorganosiloxane (I) comprises a reaction product of a reaction of:
  a) a polyorganosiloxane having an average, per molecule, of at least 2 aliphatically unsaturated organic groups,
  b) a polyorganohydrogensiloxane having an average, per molecule, of 4 to 15 silicon atoms and at least 4 silicon bonded hydrogen atoms per aliphatically unsaturated organic group in component a), and
  c) a reactive species having, per molecule, at least one aliphatically unsaturated organic group and one or more curable groups selected from acrylate groups and methacrylate groups,
  in the presence of d) a hydrosilylation catalyst.

4. The adhesive composition according to claim 2, wherein a weight percent of silicon bonded hydrogen atoms in the polyorganohydrogensiloxane b) divided by a weight percent of aliphatically unsaturated organic groups in the polyorganosiloxane a) (the $SiH_b/Vi_a$ ratio) ranges from 4/1 to 20/1 and the clustered functional polyorganosiloxane (I) prepared by the process has more than one curable group at each molecular terminal of the polyorganosiloxane of component a).

5. The adhesive composition according to claim 1, wherein a weight ratio of the organopolysiloxane polymer (a) to the alkoxy-functional organopolysiloxane resin (b) varies from 75/25 to 35/65.

6. The adhesive composition according to claim 1, wherein Q is a divalent linking radical selected from a divalent hydrocarbon radical, a divalent siloxane radical, and combinations thereof, wherein the number of carbon atoms in the hydrocarbon radical ranges from 2 to 12 and wherein the number of siloxane repeat units in the siloxane radical ranges from 0 to 20.

7. The adhesive composition according to claim 1, wherein the endcapper (iii) comprises Me$_3$Si—O—Si(Me)H—OSiMe$_3$ or Me$_3$Si—O—Si(Me)$_2$—OSiHMe$_2$, wherein Me denotes methyl.

8. The adhesive composition according to claim 1, wherein the alkoxysilane-functional organosiloxane compound (ii) is of the formula HSi(R$^{27}$)$_2$OSi(R$^{27}$)$_2$CH$_2$CH$_2$SiR$^{27}_{zz}$(OR$^{27}$)$_{3-zz}$ wherein each R$^{27}$ is independently a monovalent hydrocarbon having 1 to 6 carbon atoms and wherein the subscript zz is 0 or 1.

9. The adhesive composition according to claim 1, wherein the reactive resin and polymer (II) comprises from 5 to 50 weight percent of the total weight of the adhesive composition.

10. The adhesive composition according to claim 1, wherein alkenyl-functional siloxane resin (i) includes from 0.5 to 4 weight percent alkenyl functionality, based on the total weight of the alkenyl-functional siloxane resin (i).

11. The adhesive composition according to claim 1, wherein the radical initiator (III) comprises from 0.01 to 15 weight percent of the total weight of the adhesive composition.

12. The adhesive composition according to claim 1, wherein the moisture cure catalyst (IV) comprises from 0.001 to 5 weight percent of the total weight of the reactive resin and polymer (II).

13. The adhesive composition according to claim 1, wherein the crosslinker (V) is a condensation reaction crosslinker selected from the group consisting of trialkoxysilanes, acetoxysilanes, ketoximinosilanes, alkyl orthosilicates, methylvinyl bis(n-methylacetamido) silane, and combinations thereof.

14. The adhesive composition according to claim 1 further comprising an iron oxide pigment.

15. A method for forming a cured silicone adhesive composition on a substrate, the method comprising:
(a) forming a stable thermal radical curable silicone adhesive composition comprising:
(I) a clustered functional polyorganosiloxane having at least one radical curable group selected from an acrylate group and a methacrylate group;
(II) a reactive resin and polymer comprising:
(a) an organopolysiloxane polymer of the formula (OR$^7$)$_{3-z}$R$^6_z$Si-Q-(R$^{25}_2$SiO$_{2/2}$)$_y$-Q-SiR$^6_z$(OR$^7$)$_{3-z}$, wherein each R$^{25}$ is independently a monovalent hydrocarbon radical having 1 to 6 carbon atoms, each R$^6$ independently is a monovalent hydrocarbon radical having 1 to 6 carbon atoms, each R$^7$ independently is selected from the group consisting of an alkyl radical and alkoxyalkyl radical, Q is a divalent linking radical, the subscript z has a value of 0, 1 or 2, and the subscript y has a value of 60 to 1000, and
(b) an alkoxy-functional organopolysiloxane resin comprising the reaction product of a reaction of:
(i) an alkenyl-functional siloxane resin comprising R$^{26}_3$SiO$_{1/2}$ units and SiO$_{4/2}$ units, wherein each R$^{26}$ is independently a monovalent hydrocarbon radical having 1 to 6 carbon atoms with the proviso that at least one R$^{26}$ is an alkenyl radical, wherein the molar ratio of the R$^{26}_3$SiO$_{1/2}$ units to SiO$_{4/2}$ units has a value of from 0.5/1 to 1.5/1;

(ii) an alkoxysilane-functional organosiloxane compound having at least one silicon-bonded hydrogen atom at a molecular terminal; and
(iii) an endcapper of the formula R$^{17}_3$SiO—(R$^{17}_2$SiO)$_s$—SiR$^{17}_2$H or R$^{18}_3$SiO—(R$^{18}_2$SiO)$_t$—(HR$^{18}$SiO)—SiR$^{18}_3$ or combinations thereof, wherein each R$^{17}$ and R$^{18}$ are independently a monovalent hydrocarbon group and wherein subscripts s and t have a value ranging from 0 to 10;
in the presence of a (iv) hydrosilylation catalyst;
(III) a radical initiator;
(IV) a moisture cure initiator; and
(V) a crosslinker;
(b) applying the stable thermal radical curable silicone adhesive composition to the substrate; and
(c) curing the applied stable thermal radical curable silicone adhesive composition to form the cured silicone adhesive composition on the substrate.

16. The method according to claim 15, wherein the clustered functional polyorganosiloxane having at least one radical curable group selected from an acrylate group and a methacrylate group (I) comprises a reaction product of a reaction of:
a) a polyorganosiloxane having an average, per molecule, of at least 2 aliphatically unsaturated organic groups,
b) a polyorganohydrogensiloxane having an average, per molecule, of 4 to 15 silicon atoms and at least 4 silicon bonded hydrogen atoms per aliphatically unsaturated organic group in component a), and
c) a reactive species having, per molecule at least one aliphatically unsaturated organic group and one or more curable groups selected from acrylate groups and methacrylate groups,
in the presence of d) a hydrosilylation catalyst and e) an isomer reducing agent.

17. The method according to claim 15, wherein the clustered functional polyorganosiloxane having at least one radical curable group selected from an acrylate group and a methacrylate group (I) comprises a reaction product of a reaction of:
a) a polyorganosiloxane having an average, per molecule, of at least 2 aliphatically unsaturated organic groups,
b) a polyorganohydrogensiloxane having an average, per molecule, of 4 to 15 silicon atoms and at least 4 silicon bonded hydrogen atoms per aliphatically unsaturated organic group in component a), and
c) a reactive species having, per molecule at least one aliphatically unsaturated organic group and one or more curable groups selected from acrylate groups and methacrylate groups,
in the presence of d) a hydrosilylation catalyst.

18. The method according to claim 15, wherein (c) curing the applied stable thermal radical curable silicone adhesive composition on the substrate comprises thermally curing the applied stable thermal radical curable silicone adhesive composition on the substrate.

19. A cured silicone adhesive composition on a substrate formed in accordance with the method of claim 15.

20. The adhesive composition according to claim 3, wherein a weight percent of silicon bonded hydrogen atoms in the polyorganohydrogensiloxane b) divided by a weight percent of aliphatically unsaturated organic groups in the polyorganosiloxane a) (the SiH$_b$/Vi$_a$ ratio) ranges from 4/1 to 20/1 and the clustered functional polyorganosiloxane (I)

prepared by the process has more than one curable group at each molecular terminal of the polyorganosiloxane of component a).

* * * * *